Ic US006060572A

United States Patent [19]
Gillis et al.

[11] Patent Number: 6,060,572
[45] Date of Patent: May 9, 2000

[54] PROCESS FOR PRODUCING POLYOLEFIN ELASTOMER EMPLOYING A METALLOCENE CATALYST

[75] Inventors: Daniel J. Gillis, West Haven; Richard Karpeles, Cheshire, both of Conn.

[73] Assignee: Uniroyal Chemical Company, Inc., Middlebury, Conn.

[21] Appl. No.: 08/990,364

[22] Filed: Dec. 15, 1997

Related U.S. Application Data

[62] Division of application No. 08/630,650, Apr. 10, 1996.

[51] Int. Cl.$^7$ .................................................. C08F 36/00
[52] U.S. Cl. ........................ 526/335; 526/127; 526/160; 526/132; 526/336; 526/904; 526/943
[58] Field of Search ................................... 526/127, 160, 526/132, 335, 336, 904, 943

[56] References Cited

U.S. PATENT DOCUMENTS

| | | |
|---|---|---|
| 4,752,597 | 6/1988 | Turner . |
| 4,871,705 | 10/1989 | Hoel . |
| 4,892,851 | 1/1990 | Ewen et al. . |
| 4,931,417 | 6/1990 | Miya et al. . |
| 4,931,517 | 6/1990 | Fujita . |
| 4,933,403 | 6/1990 | Kaminsky et al. . |
| 5,001,205 | 3/1991 | Hoel .................................. 526/128 |
| 5,017,714 | 5/1991 | Wellborn, Jr. . |
| 5,026,798 | 6/1991 | Canich . |
| 5,034,549 | 7/1991 | Piotrowski et al. . |
| 5,036,034 | 7/1991 | Ewen et al. ........................... 502/117 |
| 5,055,438 | 10/1991 | Canich . |
| 5,064,802 | 11/1991 | Stevens et al. . |
| 5,086,134 | 2/1992 | Antberg et al. . |
| 5,087,677 | 2/1992 | Brekner et al. . |
| 5,126,301 | 6/1992 | Tsutsui et al. . |
| 5,126,303 | 6/1992 | Resconi et al. . |
| 5,132,262 | 7/1992 | Rieger et al. . |
| 5,132,380 | 7/1992 | Stevens et al. . |
| 5,132,381 | 7/1992 | Winter et al. . |
| 5,145,819 | 9/1992 | Winter et al. . |
| 5,153,157 | 10/1992 | Hlatky et al. . |
| 5,155,080 | 10/1992 | Elder et al. . |
| 5,225,501 | 7/1993 | Fujita et al. . |
| 5,229,478 | 7/1993 | Floyd et al. ........................... 526/160 |
| 5,241,025 | 8/1993 | Hlatky et al. . |
| 5,243,002 | 9/1993 | Razavi . |
| 5,272,236 | 12/1993 | Lai et al. ............................ 526/348.5 |
| 5,278,119 | 1/1994 | Turner et al. . |
| 5,278,265 | 1/1994 | Razavi . |
| 5,281,679 | 1/1994 | Jejelowo et al. . |
| 5,292,845 | 3/1994 | Kawasaki et al. ..................... 526/336 |
| 5,296,434 | 3/1994 | Karl et al. . |
| 5,304,614 | 4/1994 | Winter et al. . |
| 5,308,817 | 5/1994 | Reddy et al. . |
| 5,324,800 | 6/1994 | Welborn, Jr. et al. . |
| 5,328,969 | 7/1994 | Winter et al. . |
| 5,329,031 | 7/1994 | Miyake et al. . |
| 5,330,948 | 7/1994 | Marks et al. . |
| 5,331,057 | 7/1994 | Brekner et al. . |
| 5,349,032 | 9/1994 | Miyake et al. . |
| 5,369,196 | 11/1994 | Matsuroto et al. .................... 526/127 |
| 5,372,980 | 12/1994 | Davis . |
| 5,374,753 | 12/1994 | Yamada et al. . |
| 5,385,877 | 1/1995 | Fujita et al. . |
| 5,391,629 | 2/1995 | Turner et al. . |
| 5,391,789 | 2/1995 | Rohrmann . |
| 5,399,636 | 3/1995 | Alt et al. . |
| 5,401,817 | 3/1995 | Palackal et al. . |
| 5,406,013 | 4/1995 | Patsidis et al. . |
| 5,416,177 | 5/1995 | Siedle et al. . |
| 5,416,178 | 5/1995 | Winter et al. . |
| 5,416,228 | 5/1995 | Ewen et al. . |
| 5,434,115 | 7/1995 | Yamada et al. ....................... 502/103 |
| 5,436,305 | 7/1995 | Alt et al. . |
| 5,439,994 | 8/1995 | Inoue et al. . |
| 5,441,920 | 8/1995 | Welborn, Jr. . |
| 5,442,020 | 8/1995 | Davis ................................. 526/127 |
| 5,444,145 | 8/1995 | Brant et al. ......................... 526/348.3 |
| 5,449,651 | 9/1995 | Reddy et al. . |
| 5,453,410 | 9/1995 | Kolthammer et al. . |
| 5,455,365 | 10/1995 | Winter et al. . |
| 5,455,366 | 10/1995 | Rohrmann et al. . |
| 5,459,117 | 10/1995 | Ewen . |
| 5,466,649 | 11/1995 | Jejelowo . |
| 5,470,811 | 11/1995 | Jejelowo et al. . |
| 5,491,205 | 2/1996 | Langhauser et al. . |
| 5,491,207 | 2/1996 | Hoel ................................. 526/129 |
| 5,565,533 | 10/1996 | Galimberti et al. .................. 526/127 |
| 5,585,448 | 12/1996 | Resconi et al. ...................... 526/170 |
| 5,594,081 | 1/1997 | Uchino et al. ....................... 526/127 |
| 5,610,254 | 3/1997 | Sagane et al. ....................... 526/282 |
| 5,696,213 | 12/1997 | Schiffino et al. .................... 526/158 |
| 5,696,214 | 12/1997 | Sagane et al. ....................... 526/170 |

FOREIGN PATENT DOCUMENTS

| | | |
|---|---|---|
| 347129 | 12/1989 | European Pat. Off. . |
| 593083 | 4/1994 | European Pat. Off. . |
| 612769 | 8/1994 | European Pat. Off. . |
| 653445 | 5/1995 | European Pat. Off. . |
| 62-121771 | of 0000 | Japan . |
| WO95/16716 | 6/1995 | WIPO . |

OTHER PUBLICATIONS

Resconi et al., "Study on the Role of Methylalumoxane in Homogeneous Olefin Polymerization", Macromolecules, vol. 23, No. 20, pp. 4489–4491, 1990.

L. Resconi, et al (1990) *Macronol 23*, 4489–4491.

Green et al., *J. Chem. Soc. Dalton Trans.*, pp. 657–665 (1994).

Kaminsky et al., *Agnew Chem. Int. Ed. Engl.*, 34, pp. 2273–2275 (1995).

Kaminsky et al., *Journal of Polymer Science*, vol. 23, pp. 2151–2164 (1985).

*Primary Examiner*—David W. Wu
*Assistant Examiner*—Ling-Siu Choi
*Attorney, Agent, or Firm*—Raymond D. Thompson

[57] ABSTRACT

A liquid phase polymerization process is provided for producing a polyolefin elastomer, e.g., one derived from ethylene, another α-olefin such as propylene and, optionally, a diene, employing a metallocene catalyst. The process comprises contacting monomer under liquid phase polymerization conditions with a catalyst composition obtained by combining (a) a metallocene procatalyst, preferably one containing a bridging group possessing at least two bulky groups, and (b) a cocatalyst such as aluminoxane, preferably a cation-generating cocatalyst, in partial on total replacement of aluminoxane.

26 Claims, 1 Drawing Sheet

PROCESS FOR PRODUCING POLYOLEFIN ELASTOMER EMPLOYING A METALLOCENE CATALYST

This is a division of application Ser. No. 08/630,650, filed Apr. 10, 1996.

BACKGROUND OF THE INVENTION

1. Field of the Invention

This invention relates to a liquid phase polymerization process for producing a polyolefin elastomer, e.g., one derived from ethylene, another α-olefin such as propylene and, optionally, a diene, to a cation-generating cocatalyst for activating a metallocene procatalyst that can be employed in the polymerization process, to the resulting polyolefin elastomer possessing a desirably high molecular weight ($M_w$), high Mooney viscosity ($ML_{1+4}$ at 125° C.), low polydispersity index ($M_w/M_n$), low glass transition temperature ($T_g$) and low hysteresis (tan δ) and to various products manufactured therefrom including rubber articles such as hoses, belts and moldings, polymer blends containing one or more other hydrocarbon polymers and lubricating oils in which the elastomer functions as a viscosity modifier.

2. Description of the Prior Art

The most common polyolefin elastomers produced today are copolymers of ethylene and propylene (EP) and terpolymers of ethylene, propylene and a diene (EPDM). Ordinary EP elastomers can be cured using such curatives as organic peroxides, while the use of sulfur as a curative requires the incorporation of a diene. EPDM elastomers are usually produced with vanadium-organoaluminum catalysts, i.e., Ziegler-Natta catalysts.

Along with the better known EP and EPDM polymers, co- and terpolymers incorporating other α-olefins in place of propylene such as 1-butene, 1-pentene, 1-hexene, styrene, and combinations thereof are also known. EPDMs are representative of the more general category of ethylene-α-olefin diene elastomers (EODEs). Of the EODEs, EPDMs have achieved particular prominence due to the many properties which make them desirable for applications requiring good weather and acid resistance and high and low temperature performance. Notable applications of the EPDMs include their use in such products as hoses, gaskets, power transmission belts, conveyor belts, bumpers, automotive extrusions and moldings, weather stripping, blending components for plastics and rubbers such as polypropylene, polystyrene and butyl rubber, fabric coatings, viscosity modifiers for lubrication oils, tire sidewalls and in roofing and other membrane applications, shoe soles and heels and many other rubber articles. Another noteworthy application of the EPDMs is in wire and cable insulation due to their excellent dielectric properties.

It is desirable for an EPDM to have a reasonably fast cure rate and high state of cure, requirements calling for a relatively high diene content, e.g., three percent or higher. The cure rate for an EPDM elastomer and the final properties of the cured article depend upon the type of diene incorporated. For example, on a comparable diene weight percent basis, an EPDM produced with 5-ethylidiene-2-norbornene (ENB) as the diene will have a faster cure rate using a sulfur cure than would an EPDM containing dicyclopentadiene (DCPD) or 1,4-hexadiene (HD).

As for the properties of cured EPDM, EPDMs made with hexadiene as the termonomer are known to exhibit good heat resistance. For most commercial elastomer applications, the EPDM should have a weight-average molecular weight ($M_w$) of at least about 300,000, or $ML_{1+4}$ at 125° C. of at least about 20 when expressed in terms of Mooney viscosity. In many applications, it is further desirable that the molecular weight distribution (MWD) of an EPDM be characterized by a ratio of weight average molecular weight to number average molecular weight ($M_w/M_n$), i.e., polydispersity index, of not greater than about 7 and preferably not greater than about 5.

The properties of an EPDM elastomer such as its tensile strength, processability and tack can be related to its degree of crystallinity. Since in most commercial uses elastomers are higher in molecular weight than plastics, too high a degree of crystallinity can make an EPDM difficult to process at ordinary temperatures. Although good physical properties are desirable, especially in such applications as hose, tubing, wire and cable, excessive crystallinity can cause an EPDM to exhibit high hardness and stiffness resulting in a "plastic" rather than a "rubber" surface with poor surface tack.

In general, commercially useful plastics, which are homo- and copolymers of ethylene, propylene, and higher α-olefins, need not have as high a molecular weight as commercially useful elastomers of ethylene-α-olefins such as EPDM. In terms of the catalysts used for each, when producing copolymers with compositions of $M_w$ in the elastomer range, catalysts that provide high $M_w$ plastic copolymers may produce low $M_w$ polymers unsuitable for elastomer applications. Similarly, undesirable MWD changes can occur or the compositional distribution can change. Thus, catalyst performance for the production of plastics is not indicative of catalyst performance for the production of elastomers.

In most current EPDM production, the catalysts conventionally employed in the production of high molecular weight EPDM elastomers are soluble vanadium catalysts such as $VCl_4$, $VOCl_3$, $VO(Ac)_3$ or $VO(OR)_3$ where R is an alkyl group together with an organoaluminum compound. The activity of the vanadium catalysts are relatively low, e.g., producing 5–20 kg polymer/g vanadium.

In current commercial grades of EPDM, crystallinity is a function of both the ethylene content of the polymer and the catalyst system used for its production. For a given polymer composition, the catalyst system controls the fraction of ethylene units present in long ethylene sequences which are capable of crystallizing. With any given catalyst and reactor configuration, polymers with higher ethylene content will have longer ethylene sequences and be more crystalline.

In current EPDM production based on vanadium catalysts, the product EPDM polymers are completely amorphous (non-crystalline) at ethylene contents below about 55 wt %. Conversely, at ethylene contents of about. 55 wt % or greater, an EPDM will possess significant crystallinity. The degree of crystallinity depends less on the diene content of the EPDM than on the percentage of ethylene.

In order for the catalyst system to be useful for the commercial production of an EPDM elastomer, it is desirable for the crystallinity of the polymer to be roughly comparable to that of currently available commercial grades of EPDM for most applications.

Metallocene catalysts typically consist of a transition-metal atom sandwiched between ring structures to form a sterically hindered site. Plastics obtained with metallocene catalysts tend to have increased impact strength and toughness, good melt characteristics, and improved clarity in films.

In actual practice, the extent to which metallocene catalysts can effectively replace traditional catalysts in polymer production depends on the cost and efficiency of the system. Metallocene catalysts cost significantly more than the traditional Ziegler-Natta catalysts but the metallocene systems are considerably more productive. In some cases, the increased productivity of metallocene catalysts relative to the Ziegler-Natta catalysts ranges from one to two orders of magnitude more polymer produced per pound of catalyst.

Since the recent introduction of aluminoxane-activated metallocene catalysts for the production of polyethylene, polypropylene, and copolymers of ethylene and α-olefins such as linear low density polyethylene (LLDPE), some effort has been made to apply these catalysts to the production of EPDM elastomers. For this use, it is desired that the catalyst produce high yields of EPDM in a reasonable polymerization time, result in adequate incorporation of the diene monomer(s) and provide a random distribution of monomers while enabling good control of $M_w$ over a wide range while yielding a relatively narrow MWD.

Kaminsky et al., *J. Poly. Sc.*, Vol. 23, 2151–2164 (1985), discloses the use of a metallocene-methylaluminoxane (MAO) catalyst system to produce low molecular weight EPDM elastomers, i.e., $M_w$s of not greater than about 150,000. Such catalysts require long reaction times and provide low yields and are therefore impractical for commercial EPDM manufacture. Similarly, Japanese Patent 62-121,771 describes a metallocene-catalyzed polymerization process yielding an ethylene-1-butene-diene elastomer of high ethylene content in low yield.

Other polymerization processes for producing EPDMs featuring the use of a metallocene catalyst activated by an aluminoxane such as MAO are described, e.g., in U.S. Pat. Nos. 4,871,705, 5,001,205, 5,229,478 and 5,442,020, EP 347,129 and WO 95/16716. As discussed more fully below, the lack of more widespread commercial implementation of metallocene catalysts where the production of high molecular weight elastomers is concerned is due at least in part to the need to use very large amounts of aluminoxane cocatalyst to activate the metallocene to acceptable levels.

EPA 593,083 describes a gas phase polymerization process for producing EPDM employing a bridged metallocene catalyst (1)

diphenylmethylene
(cyclopentadienyl) (fluorenyl)
zirconium dichloride

Gas phase polymerization, however, is prone to a number of technical difficulties, reactor fouling among them, that need to be overcome before this type of process for producing EPDM elastomers will achieve general acceptance by the industry.

EPA 612,769 and EP 653,445 both disclose the use of metallocene catalyst (1) in a solution phase polymerization process for producing linear low [molecular weight] propylene-diene elastomer (LLPDE) in contrast to a high molecular weight elastomer that is an object of the present invention.

U.S. Pat. No. 5,401,817 describes a polymerization process employing bridged metallocene catalyst (2):

diphenylsilyl (cyclopentadienyl)
(fluorenyl) zirconium dichloride

There is, however, no mention of producing an elastomer in this patent.

Green et al., *J. Chem. Soc. Dalton Trans.*, 657–665 (1994) describes the polymerization of propylene and styrene employing a bridged metallocene catalyst (3):

diphenylmethylene
(cyclopentadienyl) (indenyl)
zirconium chloride

No mention of producing an elastomer is made in this publication.

Kaminsky et al., *Angew. Chem. Int. Ed. Enql.*, 34, 2273–2275 (1995) describes bridged metallocene catalyst (4), together with MAO, for the copolymerization of ethylene with bulky cycloalkenes:

diphenylsilyl
(cyclopentadienyl) (indenyl)
zirconium dichloride

Another aspect of the present invention lies in the discovery that not all bridged metallocene-catalysts will provide high molecular weight elastomers. Thus, e.g., it has been found that bridged metallocene catalyst (5)

dimethylmethylene
(cyclopentadienyl) (fluorenyl)
zirconium dichloride which differs from metallocenes (1)–(4), supra, only in the nature of the bridging group joining the two cyclopentadienyl-derived ligands provides low molecular weight (<50,000) ethylene-propylene copolymers. In contrast to this result and as discovered herein, activated metallocene catalyst (1) provides elastomers of high molecular weight (>300,000).

Bridged metallocene catalysts (6) and (7) possessing the bis(indenyl) and the bis(fluorenyl) structures, respectively, are capable of providing high molecular weight amorphous ethylene-propylene copolymers:

6 racemic-dimethylsilyl
bis (2-methylindenyl)
zirconium dichloride

7 ethylene-bridged
bis (fluorenyl)
zirconium dichloride

Metallocenes (6) and (7) are described in U.S. Pat. Nos. 5,145,819 (indenyl) and 5,436,305 (fluorenyl) for the production of homopolymers. No mention is made in either patent of employing the disclosed metallocene for the production of an EPDM-type elastomer.

As previously mentioned, it has been discovered that one of the obstacles to widespread commercial implementation of metallocene catalysis lies in the use of an aluminoxane as cocatalyst. Aluminoxanes are expensive and large amounts are required in order to activate the metallocene catalyst with which they are associated.

SUMMARY OF THE INVENTION

It is an object of the present invention to provide a liquid phase polymerization process, i.e., one carried out under solution or slurry conditions and in batch or continuously, for producing a polyolefin elastomer employing as the catalyst composition an activated bridged metallocene in which the bridging group possesses at least two bulky groups.

It is a further object of the invention to provide such a process for the polymerization of olefins to provide high molecular weight EP and EODEs such as the EPDMs.

Yet another object of the invention is to provide a catalytically active composition comprising a metallocene procatalyst activated by a particular type of cation-generating cocatalyst.

Additional objects of the invention include providing a polyolefin elastomer possessing a combination of high molecular weight, high Mooney viscosity, low polydispersity index, low glass transition temperature and low hysteresis and various products manufactured therefrom.

In keeping with these and other objects of the invention, there is provided a process for the liquid phase polymerization of ethylene, at least one other α-olefin and, optionally, at least one diene monomer to provide an elastomer, the process comprising contacting the monomer under liquid phase polymerization conditions with a catalytically effective amount of a catalyst composition comprising the product obtained by combining (a) a metallocene procatalyst, preferably one containing a bridging group possessing at least two bulky groups, and (b) a cocatalyst, preferably a cation-generating cocatalyst as hereinafter described.

The polyolefin elastomers obtained by the process of this invention are themselves novel, possessing, in combination, a higher molecular weight ($M_w$), higher Mooney viscosity ($ML_{1+4}$ at 125° C.) a lower polydispersity index ($M_w/M_n$), a lower glass transition temperature ($T_g$) and a lower hysteresis (tan δ) than these same properties in known polyolefin elastomers incorporating equivalent amounts of the same olefins. These elastomers confer advantageous properties on products manufactured therefrom relative to the same products manufactured from known elastomers.

The terms "metallocene" and "metallocene procatalyst" as used herein shall be understood to refer to compounds possessing a transition metal M, at least one non-cyclopentadienyl-derived ligand X and zero or one heteroatom-containing ligand Y, the ligands being coordinated to M and corresponding in number to the valence thereof. Such compounds, cocatalysts useful for their activation to provide metallocene catalysts that may be employed for the polymerization of olefins to provide polyolefin homopolymers and copolymers and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

DESCRIPTION OF THE PREFERRED EMBODIMENTS

The polymerization process herein employs a catalyst composition obtained by activating a metallocene procatalyst with a suitable cocatalyst.

The metallocene procatalyst is preferably one or a mixture of metallocene compounds of either or both of the following general formulae:

wherein $Cp^1$ of ligand $(Cp^1R^1_m)$ and $Cp^2$ of ligand $(Cp^2R^2_p)$ are the same or different cyclopentadienyl rings, $R^1$ and $R^2$ each is, independently, halogen or a hydrocarbyl, halocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring containing from 4 to about 20 carbon atoms, $R^3$ is a bridging group, n is 0 or 1, Y is a heteroatom-containing ligand in which the heteroatom is coordinated to M, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2, r has the value of n and s is equal to the valence of M minus 1 when r is 0 and is equal to the valence of M minus 2 when r is 1.

Methods for preparing these and other useful metallocene procatalysts are known in the art and do not constitute a part of the present invention.

Metallocene procatalyst (I) can be activated either with an aluminoxane or, preferably, with the cation-generating cocatalyst hereinafter described. If the metallocene procatalyst is entirely one of formula (II), it is activated with the aforementioned cation-generating cocatalyst. However, where the metallocene procatalyst is one of formula (I) and the cocatalyst is entirely an aluminoxane, ligand $(Cp^1R^1_m)$ must be different from ligand $(cp^2R^2_p)$, bridging group $R^3$ must contain at least two bulky groups and the value of n must be 1. Of these bridged metallocenes, it is preferred that bridging group $R^3$ possess the structure in which bulky groups $R^4$ and $R^5$ each, independently, is, or contains, a cyclohydrocarbyl group containing up to about 20, and preferably from 6 to about 12, carbon atoms and from 0 to 3 heteroatoms such as oxygen, sulfur, tertiary nitrogen, boron or phosphorus and, in particular, is a cycloalkyl, heterocycloalkyl, cycloalkenyl, heterocycloalkenyl, aryl, heteroaryl, alkaryl, alkylheteroaryl, aralkyl, heteroaralkyl, and so forth, M is titanium, zirconium or hafnium, q is 2 and each X is halogen.

Of this preferred group of bridged metallocenes, those in which ligand $(Cp^1R^1_m)$ is unsubstituted cyclopentadienyl, ligand $(Cp^2R^2_p)$ is indenyl or fluortenyl, M is zirconium, $R^4$ and $R^5$ each is phenyl and each X ligand is chlorine are still more preferred. These more preferred metallocenes correspond to known metallocene compounds (1)–(4), supra.

Still other preferred bridged metallocenes (I) that can be used in the polymerization process of this invention include:
diphenylmethylene(indenyl)(fluorenyl)zirconium dichloride,
diphenylmethylene(cyclopentadienyl)(4,5,6,7-tetrahydroindenyl)zirconium dichloride,
diphenylmethylene(cyclopentadienyl)(2-methylindenyl) zirconium dichloride,
diphenylmethylene(2,4-dimethylcyclo-pentadienyl)(3',5'-dimethylcyclopentadienyl)zirconium dichloride,
diphenylmethylene(2-methyl-4-tert-butylcyclo-pentadlenyl) (3'-tert-butyl-5'-methylcyclopentadienyl)zirconium dichloride,
dixylylmethylene(2,3,5-trimethylcyclopentadienyl) (2',4',5'-trimethylcyclopentadienyl)zirconium dichloride,
dixylylmethylene(2,4-dimethylcyclopentadienyl)(3',5'-dimethylcyclopentadienyl)zirconium dichloride,
dixylylmethylene(2-methyl-4-tert-butylcyclopentadienyl) (3'-tert-butyl-5-methylcyclopentadienyl)zirconium dichloride,
dixylylmethylene(cyclopentadienyl)(fluorenyl)zirconium dichloride,
di-o-tolylmethylene(cyclopentadienyl)(3,4-dimethylcyclopentadienyl)zirconium dichloride,
di-o-tolylmethylene(cyclopentadienyl)(3,4-dimethylcyclopentadienyl)zirconium dichloride,
di-o-tolylmethylene(cyclopentadienyl)(3,4-dimethylcyclopentadienyl)zirconium dichloride,
di-o-tolylmethylene(cyclopentadienyl)(indenyl)zirconium dichloride,
dibenzylmethylene(cyclopentadienyl) (tetramethylcyclopentadienyl)zirconium dichloride,
dibenzylmethylene(cyclopentadienyl)(indenyl)zirconium dichloride,
dibenzylmethylene(cyclopentadienyl)(fluorenyl)zirconium dichloride,
dicyclohexylmethylene(cyclopentadienyl)(indenyl) zirconium dichloride,
dicyclohexyl(cyclopentadienyl)(fluorenyl)zirconium dichloride,
dicyclohexylmethylene(2-methylcyclopentadienyl) (fluorenyl) zirconium dichloride,
diphenylsilyl(2,4-dimethylcyclopentadienyl)(3',5'-dimethylcyclopentadienyl)zirconium dichloride,
diphenylsilyl(2,4-dimethylcyclopentadienyl)(3',5'-dimethylcyclopentadienyl)zirconium dichloride,
diphenylsilyl(2,3,5-trimethylcyclopentadienyl)(2,4,5-trimethylcyclopentadienyl)zirconium dichloride,
tetraphenyldisilyl(cyclopentadienyl)(indenyl)zirconium dichloride,
tetraphenyldisilyl(3-methylcyclopentadienyl)(indenyl) zirconium dichloride,
tetraphenyldisilyl(cyclopentadienyl)(fluorenyl)zircanium dichloride,
di-o-tolylsilyl(cyclopentadienyl) (trimethylcyclopentadienyl) zirconium dichloride,
di-o-tolylmethylene(cyclopentadienyl)(3,4-dimethylcyclopentadienyl)zirconium dichloride, di-o-tolylmethylene(cyclopentadienyl)(3,4-dimethylcyclopentadienyl)zirconium dichloride,
di-o-tolylmethylene(cyclopentadienyl)(3,4-dimethylcyclopentadienyl)zirconium dichloride,
di-o-tolylmethylene(cyclopentadienyl)(indenyl)zirconium dichloride,
dibenzylmethylene(cyclopentadienyl)(tetramethylcyclopentadienyl)zirconium dichloride,
dibenzylmethylene(cyclopentadienyl)(indenyl)zirconium dichloride,
dibenzylmethylene(cyclopentadienyl)(fluorenyl)zirconium dichloride,
dicyclohexylmethylene(cyclopentadienyl)(indenyl) zirconium dichloride,
dicyclohexyl(cyclopentadienyl)(fluorenyl)zirconium dichloride,
dicyclohexylmethylene(2-methylcyclopentadienyl)(fluorenyl) zirconium dichloride,
diphenylsilyl(2,4-dimethylcyclopentadienyl)(3',5'-dimethylcyclopentadienyl)zirconium dichloride,
diphenylsilyl(2,4-dimethylcyclopentadienyl)(3',5'-dimethylcyclopentadienyl)zirconium dichloride,
diphenylsilyl(2,3,5-trimethylcyclopentadienyl)(2,4,5-trimethylcyclopentadienyl)zirconium dichloride,
tetraphenyldisilyl(cyclopentadienyl)(indenyl)zirconium dichloride,
tetraphenyldisilyl(3-methylcyclopentadienyl)(indenyl) zirconium dichloride,
tetraphenyldisilyl(cyclopentadienyl)(fluorenyl)zirconium dichloride,
di-o-tolylsilyl(cyclopentadienyl)(trimethylcyclopentladienyl) zirconium dichloride,
di-o-tolylsilyl(cyclopentadienyl)(tetramethylcyclopentadienyl)zirconium dichloride,
di-o-tolylsilyl(cyclopentadienyl)(3,4-diethylcyclopertadienyl)zirconium dichloride,
di-o-tolysilyl(cyclopentadienyl)(triethylcyclopentadienyl) zirconium dichloride,
dibenzylsilyl(cyclopentadienyl)(fluorenyl)zirconium dichloride,
dibenzylsilyl(cyclopentadienyl)(2,7-di-t-butyl-fluorenyl) zirconium dichloride, and
dicyclohexylsilyl(cyclopentadienyl)(flurorenyl)zirconium dichloride.

In the preferred metallocene procatalysts of formula (II), n and r are both 1, the valence of M is 3 4, X is halogen and s is 2. Illustrative of such preferred metallocene procatalysts (II) that can be activated by the cation-generating cocatalyst of this invention are the following:
dimethylsilyl(tetramethylcyclopentadienyl)(cyclohexylamido) zirconium dichloride,
dimethylsilyl(3,4-dimethyl cyclopentadienyl)(cyclohexylamido)hafnium dichloride,
dimethylsilyl(tetramethylcyclopentadienyl)(butylamido)titanium dichloride,
dimethylsilyl(3,4-di-t-butylcyclopentadienyl)(cyclododecylamido)titanium dichloride,
dimethylsilyl(2,5-dimethylcyclopentadienyl)(cyclododecylamido)titanium dichloride,
di-n-propylsilyl(2,5-dimethylcyclopentadienyl) (p-n-butylphenylamido)titanium dichloride,
di-isopropylsilyl(2-indenyl)(cyclohexylamido)zirconium dihalide,
diphenylsilyl(tetra-n-propylcyclopentadienyl)(isopropylamido)zirconium dihalide, and
dimethylmethylene(2-methyl-5-t-butylcyclopentadienyl)(dimethylamido)zirconium dihalide.

The cocatalyst, or activator, employed with the preferred bridged metallocene procatalysts of formula (I) can, as previously stated, be any of the aluminoxanes known to activate metallocene procatalysts. For further details of the aluminoxane cocatalysts including such alkylaluminoxanes as MAO see, e.g., U.S. Pat. No. 5,229,478. In general, the bridged metallocene procatalyst can be present in the reactor in an amount, expressed in terms of its transition metal content, of from about 0.0001 to about 0.02, preferably from about 0.0002 to about 0.015 and more preferably from about 0.0002 to about 0.01, millimoles/liter. Corresponding to these amounts of transition metal, the aluminoxane cocatalyst can be utilized in an amount of from about 0.01 to about 100, preferably from about 0.02 to about 75 and more preferably from about 0.025 to about 50, millimoles/liter. It will, of course, be recognized that optimum levels of bridged metallocene procatalyst and aluminoxane cocatalyst will to some extent depend upon the specific procatalyst and cocatalyst selected as well as other polymerization process variables.

When employing an aluminoxane cocatalyst, it can be advantageous to include a trialkylaluminum such a, trimethylaluminum, triethylaluminum, tri(n-propyl)aluminum, triisopropyaluminum, tri(n-butyl)aluminum, triisobutylaluminum, and the like, to reduce the amount of aluminoxane required for suitable activation of the metallocene procatalyst. In general, the optional trialkylaluminum can be utilized in a molar ratio to metallocene procatalyst of from about 1 to about 1000 and preferably from about 2 to about 500.

Preferably, however, the cation-generating cocatalyst of the composition described below is used to activate metallocene procatalysts (I) and (II). This preferred cocatalyst can be used as a partial or complete replacement for the aluminoxanes, not only for the preferred bridged metallocenes described above, but for any of the metallocene procatalysts, whether bridged or nonbridcred, with which the invention is concerned. More particularly, the cation-generating cocatalyst herein comprises: as a first component, a metal- and/or metalloid-containing compound capable of exchanging at least one X ligand in the metallocene procatalyst up to the total number thereof with, independently, a hydrogen atom or a carbohydryl group) containing up to about 20 carbon atoms or oxycarbohydryl group containing up to 20 carbon atoms; as a second component, a neutral metal- and/or metalloid-containing compound having at least one aryl group possessing at least one electron-withdrawing substituent; and, as a third component an anionic metal- and/or metalloid-containing compound having at least one aryl group possessing at least one electron-withdrawing substituent.

Activation of the metallocene procatalyst can be achieved by combining the metallocene with the aforementioned components of the cation-generating cocatalyst either simultaneously or in any sequence and with any interval of time therebetween. For reasons discussed below, in situ activation of the procatalyst, i.e., within the polymerization reactor in the presence of monomer, is preferred. However, it is also within the scope of the invention to achieve activation of the procatalyst in other ways, for example, by reacting the metallocene procatalyst with the first component of the cocatalyst and thereafter combining the product of this reaction with the second and third components of the cocatalyst either simultaneously or sequentially either within, or in the absence of, the olefin monomer. In general, the molar ratio of the first component of the cocatalyst to metallocene procatalyst can vary from 1 to about 500 and preferably from about 2 to about 500 and the molar ratios of the second and third components of the cocatalyst to metallocene procatalyst can, independently, vary from about 0.5 to about 10 and preferably from about 0.8 to about 5.

The metal- or metalloid-containing first component for providing the cation-generating cocatalyst herein can advantageously be an aluminum compound of the general formula $AlR^4R^5R^6$ in which $R^4$, $R^5$ and $R^6$ each, independently, is a hydrocarbyl, e.g., alkyl, or oxyhydrocarbyl, e.g., alkoxy, group containing up to about 20 carbon atoms, or hydrogen, provided that no more than two of $R^4$, $R^5$ and $R^6$ and be hydrogen. Suitable aluminum compounds include trimethylaluminum, triethylaluminum, tri(n-propyl) aluminum, triisopropylaluminum, tri(n-butyl)aluminum, tri (n-propyl) aluminum, triisobutylaluminum, tri(n-hexyl) aluminum, tri(n-octyl)aluminum, dimethyaluminum hydride, diethylaluminum hydride, diisopropylaluminum hydride, di(n-propyl)aluminum hydride, diisobutylaluminum hydride, di(n-butyl)aluminum hydride, dimethylaluminum ethoxide, di(n-propyl)aluminum ethoxide, diisobutylaluminum ethoxide, di(n-butyl)aluminum ethoxide, and the like. Of the foregoing aluminum compounds, the trialkylaluminums are preferred and of these, triethylaluminum and triisobutylaluminum are more preferred. Additional representatives of compounds that can be used as the first component of the cocatalyst are alkali metal organometallics, alkaline earth organometallics and organometal halides (e.g., Grignard reagents), hydrocarbyl complexes of such metals and organometalloids such as those of boron, zinc, gallium, germanium, arsenic, tellurium mercury, lead, and the like.

Useful second components for providing the preferred cocatalysts include boranes such as tris(pentafluorophenyl) borane, tris(methoxyphenyl)boriine, tris(trifluoromethylphenyl)borane, tris(3,5-di[trifluoromethyl]phenyl)borane, tris(tetrafluoroxylyl)borane, tris(tetrafluoro-o-tolyl)borane, and the like. Of the foregoing boranes, tris (pentafluorophenyl)borane and tris(3,5-di[trifluoromethyl] phenyl)borane are preferred. Other useful second components include aluminum homologues of the foregoing compounds.

Specific third components that can be used in the preferred cocatalysts include borates such as lithium tetrakis (pentafluorophenyl)borate, lithium tetrakis (trifluoromethylphenyl)borate, lithium tetrakis(3,5-di [trifluoromethyl]phenyl)borate, sodium tetrakis (pentafluorophenyl)borate, potassium tetrakis (pentafluorophenyl)borate, magnesium tetrakis (pentafluorophenyl)borate, titanium tetrakis (pentafluorophenyl)borate, tin tetrakis(pentafluorophenyl) borate, and the like. Of the foregoing boratess, alkali metal borates such as lithium tetrakis(pentafluorophenyl) borate and lithium tetrakis(3,5-di[trifluoromethyl]phenyl)borate are preferred. Other useful third components include aluminate homologues of the foregoing compounds.

The activated metallocene catalyst composition can be prepared in advance and thereafter introduced into the polymerization reactor. However, when employing the preferred cation-generating cocatalyst, supra, it is highly preferred to activate the metallocene procatalyst with the cocatalyst components in situ, which is to say, in the presence of monomer. There are considerable advantages to such in situ activation.

The metallocene procatalysts in which each X ligand is a halogen are fairly stable compounds and impose no special handling or storage requirements. However, the metallocenes in which one or more X ligands is a hydrogen atom or a hydrocarbyl group are highly susceptible to degradation when exposed to oxygen, moisture, light and/or heat. When prepared in advance, care must be taken to store these metallocenes in a manner which will exclude all of these conditions. This is especially the case with the metallocene hydrides which are extremely unstable. For these reasons, it is preferred to activate the metallocene procatalyst with the preferred cocatalyst within the polymerization reactor in the presence of monomer. Activating the procatalyst in this way avoids or greatly diminishes the possibility of forming catalytically inactive degradation products.

There are still other significant advantages to in situ activation of the metallocene procatalyst. Thus, in situ activation offers the flexibility of adjusting the quantity of aluminum component in the cocatalyst to compensate for process conditions in the polymerization reactor, e.g., via reactive scavenging of polar impurities. Use of preformed metallocene hydrides, hydrocarbyls or oxyhydrocarbyls would necessitate an independent feed of such a scavenger such representing a complication of the polymerization process. In addition, it has been observed herein that activation in the presence of olefin monomer results in significantly higher initial polymerization activity than the same catalyst activated in advance of its introduction into the polymerization reactor.

The $\alpha$-olefins suitable for use in the preparation of the elastomers herein contain from 3 to about 20 carbon atoms and include propylene, 1-butene, 3-methylbutene, 1-pentene, 4-methyl-1-pentene, 1-hexene, 1-octene, 1-decene, 1-dodecene, and vinyl aromatic monomers such as styrene, $\alpha$-methyl styrene and the like, with propylene being the $\alpha$-olefin of choice.

The optional diene monomer(s) can be conjugated or nonconjugated. Conjugated monomers include butadiene, isoprene, 2,3-d-methylbutadiene and cyclopentadiene.

Examples of suitable nonconjugated dienes include straight chain acyclic dienes such as 1,4-hexadiene, 1,5-hexadiene, 1,6-heptadiene, and, 1,7-octadiene; branched chain acyclic dienes such as 4-methyl-1,5-hexadiene, 5-methyl-1,4-hexadiene, 3,7-dimethyl-1,6-octadiene, 3-7-dimethyl-1,7-octadiene and mixed isomers of dihydromyrcene and dihydroocinene; unsubstituted and substituted cyclic dienes such as 1,4-cyclohexadiene, 1,5-cyclooctadiene and 1,5-cyclododecadiene; and, multicyclic dienes such as tetrahydroindene, methyltetrahydroindene, dicyclopentadiene; bicyclo-(2,2,1)-hepta-2,6-diene; alkenyl, alkylidene, cycloalkenyl and cycloalkylidene norbonenes such as 5-methylene-2-norbornene, 5-ethylidene-2-norbornene, 5-propenyl-2-norbornene, 5-isopropylidene-2-norbornene, 5-butenyl-2-norbornene, 5-(4-cyclopentenyl)-2-norbornene, 5-cyclohexylidene-2-norbornene, 5-vinyl-2-norbornene and norbornadiene. Of the dienes typically used to prepare EODEs, the preferred ones are 1,4-hexadiene, 5-ethyllidene-2-norbornene, 5-vinylidene-2-norbornene, 5-methylene-2-norbornene and dicyclopentadiene and of these, 5-ethylidene-2-norbornene, 1,4-hexadiene and dicyclopentadiene are more preferred.

When employing a diene that results in little if any branching in the product elastomer, e.g., such dienes as 1,4-hexadiene, ethylidene-2-norbornene, dicyclopentadiene, 1-methylcyclopentadiene, indene, and the like, it can be advantageous to the properties of the product elastoimer to include within the monomer mixture a diene that provides branching. Branching dienes, as they may be called, include branched or unbranched acyclic dienes such as 1,5-hexadiene, 1,7-octadiene or 4-methyl-1,5-hexadiene; substituted or unsubstituted cyclic dienes such as cyclopentadiene, 3-methyl-1,4-cyclopentadiene, vinyl cyclohexene or norbornadiene; alkenyl-substituted norbornenes such as 5-methylene-2-norbornene, 5-vinyl-2-norbornene, 5-propenyl-2-norbornene or 5-butenyl-2-norbornene; conjugated acyclic dienes such as butadiene, isoprene or 2,3-dimethylbutadiene; and, dialkenylaromatic dienes such as divinylbenzene.

The preferred elastomeric ethylene-α-olefin copolymers and EODEs can contain up to about 90, preferably from about 30 to about 85, and more preferably from about 35 to about 80, weight percent ethylene, the balance being α-olefin(s) and optional diene monomer(s). The diene monomer(s), when utilized, can be incorporated into the EODE at a level of from about 0.1 to about 30, preferably from about 1 to about 25, and more preferably from about 1 to about 20, weight percent.

Polymerization of the aforementioned monomers using the catalyst of the present invention is carried out in the liquid phase, i.e., in a solution or slurry process, either continuously or in batch. These processes are generally carried out at temperatures in the range of from about $-20°$ C. to about $300°$ C. and preferably from about $0°$ C. to about $200°$ C., and pressures from about 5 to about 2000 psig. Dilution solvents that can be employed include straight and branched chain hydrocarbons such as the butanes, the pentanes, the hexanes, the heptanes, the octanes, and the like, cyclic and alicyclic hydrocarbons such as cyclopentane, cyclohexane, cycloheptane, methylcyclopentane, methylcyclohexane, methylcycloheptane and the like, and alkyl-substituted aromatic compounds such as toluene, xylene, and the like.

A typical batch solution polymerization process can be carried out by first introducing the hydrocarbon solvent, e.g., cyclohexane, into a stirred tank reactor. The monomer feed comprising ethylene, α-olefin, e.g., propylene, and diene(s) (if utilized) is then sparged into the liquid phase. A hydrocarbon solution of the cocatalyst followed by a hydrocarbon solution of the metallocene procatalyst in the required amounts are then added to the liquid phase in the reactor. The rate of polymerization is controlled by the concentration of the catalyst. The reactor temperature is controlled by means of cooling coils, etc., and the initial total pressure in the reactor is maintained by a constant flow of gaseous monomer(s). By maintaining a faster rate of flow of gas(es) through the reactor than the rate of polymerization, the conditions in the reactor will approximate steady state conditions. The ethylene content of the elastomer product is determined by the metallocene catalyst used and by the ratio of ethylene to δ-olefin in the reactor which is controlled by manipulating the relative feed rates of these monomers to the reactor. After polymerization and deactivation of the catalyst followed by coagulation of the elastomer, the latter can be recovered by any suitable means and further processed as desired.

In a slurry polymerization process, a suspension of the solid, particulate polymer is formed in the hydrocarbon diluent to which ethylene, α-olefin(s), any optional diene(s) and the components of the catalyst composition have been added. Slurry polymerization proceeds much like solution polymerization.

Preffered polyolefin elastomers that can be obtained by the polymerization process herein possess a unique combination of high molecular weight ($M_w$), high Mooney viscosity ($ML_{1+4}$) low polydispersity index ($M_w/M_n$), low glass transition temperature ($T_g$) and low hysteresis (tan δ) properties that distinguish them from known polyolefin elastomers. The novel polyolefin elastomers of this invention prior to curing possess an $M_w$ of from about 200,000 to about 2,000,000, preferably from about 275,000 to about 1,750,000 and more preferably from about 300,000 to about 1,500,000, an $ML_{1+4}$ at $125°$ C. of from about 10 to about 200, preferably from about 15 to about 175 and more preferably from about 20 to about 150, an $M_w/M_n$ of from about 1.25 to about 10, preferably from about 1.5 to about 8.5 and more preferably from about 2.0 to about 7.5, a $T_g$ (° C.) of below about $-25$, preferably below about $-30$ and more preferably below $-35$ and a tan δ of from about 0.3 to about 7, preferably from about 0.35 to about 6 and more preferably from about 0.4 to about 5.

These advantageous properties can be exploited in a variety of products. Thus, polymer blends can be prepared which contain an elastomer in accordance with this invention and one or more other hydrocarbon polymers with which elastomers such as the EPDMs are known to be compatible, e.g., poly(α-olefin) homopolymers and copolymers, polystyrene, ethylene/cycloolefin copolymer, butyl rubber, polyisoprene, polybutadiene, and the like. The elasiomer herein can be incorporated into any of a wide assortment of rubber articles such as hoses, tubing, power transmission belts including V-belts, conveyor belts, timing belts and industrial flat belts, air springs, roofing membranes, weather stripping, bushings, vibration mounts, bridge bearing pads, shoe soles and heels, jacketing for wire or cable, and the like. The elastomer of this invention is also useful as a viscosity modifier for lubricating oils.

To facilitate the manufacture of a polymer blend, the elastomer herein can be provided as an oil-extended polymer prior to mixing with the other hydrocarbon polymer. The elastomer can be oil-extended by the well known procedure of adding oil to the polymer after it is recovered from the polymerization reactor. The oil can be selected from the naphthenic or paraffinic oils, typically in amounts of from about 5 to about 150 parts by weight of oil per 100 parts by weight of elastomer. Alternatively, part or all of the oil can be added to the elastomer and other hydrocarbon polymer during the blending operation.

The elastomer of this invention can be formulated in a known manner with any of the many usual compounding ingredients, for example, a vulcanizing or curative package containing one or more vulcanizing agents, accelerators, activators, retarders, and the like. Other common formulation ingredients include antiozonants, antioxidants, plasticizing oils and softeners, fillers, reinforcing pigments and carbon blacks.

EXAMPLES

The examples that follow include those that are illustrative of the invention (Examples 1–27) and those that are illustrative of known polymerization processes, catalysts and elastomers (Comparative Examples 1–48). The procatalysts, MAO cocatalyst, cation-generating cocatalyst components, solvents and monomers employed in these examples are as follows:

1. bis (cyclopentadienyl) zirconium dichloride[$Cp_2ZrCl_2$]
2. diphenylmethylene(cyclopentadienyl)(fluorenyl) zirconium dichloride[$Ph_2C$ (Cp-9-Flu)$ZrCl_2$]
3. diphenylsilyl(cyclopentadienyl)(fluorenyl)zirconium dichloride[$Ph_2Si$ (Cp-9-Flu)$ZrCl_2$]
4. diphenylmethylene(cyclopentadienyl)(indenyl)zirconium dichloride[$Ph_2C$ (Cp-9'-Ind)$ZrCl_2$]
5. diphenylsilyl(cyclopentadienyl)(indenyl)zirconium dichloride[$Ph_2Si$ (Cp-9'-Ind)$ZrCl_2$]
6. dimethylmethylene(cyclopentadienyl)(fluorenyl) zirconium dichloride[$Me_2C$ (Cp-9-Flu)$ZrCl_2$]
7. racemic-dimethylsilylbis(2-methylindenyl)zirconium dichloride[rac-$Me_2Si$ (2-Me-Ind)$_2ZrCl_2$]
8. dimethylsilylbis (cyclopentadienyl)zirconium dichloride [$Me_2Si$ (Cp)$_2ZrCl_2$]

9. dimethylsilylbis (fluorenyl)zirconium dichloride [Me$_2$Si (Flu)$_2$ZrCl$_2$]
10. racemic-ethylenebis (indenyl) zirconium dichloride [racEt(Ind)$_2$ZrCl$_2$]
11. racemic-dimethylsilylbis(indenyl)zirconium dichloride [rac-Me$_2$Si (Ind)$_2$ZrCl$_2$]
12. racemic-ethylenebis(indenyl)hafnium dichloride [rac-Et (Ind)$_2$HfCl$_2$]
13. racemic-dimethylsilylbis(indenyl)hafnium dichloride [rac-Me$_2$Si (Ind)$_2$]
14. dimethylsilyl(tetramethylcyclopentadienyl) (t-butylamido) titanium dichloride [Me$_2$Si(Cp*) (NBu$^t$) TiCl$_2$]
15. tris(pentafluorophenyl) borane [B (C$_6$F$_5$)$_3$]
16. trityl tetrakis(pentafluorophenyl)borate [Ph$_3$CB:(C$_6$F$_5$)$_4$]
17. dimethylanilinium tetrakis(pentafluorophenyl)borate [HNMe$_2$PhB (C$_6$F$_5$)$_4$]
18. lithium tetrakis (pentafluorophenyl)borate [LiB(C$_6$F$_5$)$_4$]
19. methyl aluminoxane [MAO]
20. triisobutylaluminum [Al(Bu$^i$)$_3$], 25 weight % Al in hexanes, 0.86M Al Hexane solvent was purified over 3 Å molecular sieves. Toluene solvent was distilled from molten sodium and degassed with dry, deoxygenated argon. Ethylene and propylene, both high purity grade monomers, were purified by passage over molecular sieves and a deoxygenation catalyst. The diene monomers 5-ethylidene-2-norbornene [ENB], dicyclopentadiene [DCPD], 5-vinyl-2-norbornene [VNB] and 1,7-octadiene [OD] were deinhibited over activated alumina and stored over 4 Å molecular sieves.

The following procedures were used to determine the properties of the elastomers.

Weight Average Molecular Weight ($M_w$), Number Average Molecular Weight ($M_n$) and ($M_w/M_n$)

The molecular weights of the elastomers, $M_w$ and $M_n$, were measured in orthodichlorobenzene at 130° C. on a Waters GPC 150C gel permeation chromatograph equipped with a Waters RA401 refractive index detector and Waters Styragel HT columns (10E5 Å, 10E4 Å, 10E3 Å, and 10E6 Å). Molecular weights were calculated from elution times calibrated against polystyrene standards from American Polymer Standards Corp. (narrow molecular weight distribution, $M_n$ from 9300 to 2.1×10$^6$)

Mooney Viscosity ($ML_{1+4}$ at 125° C.)

The Mooney viscosity of the elastomers, $ML_{1+4}$ at 125° C., was measured on a Monsanto Mooney Viscometer model MV 2000 according to ASTM standard D1646.

Glass Transition Temperature ($T_g$)

The glass transition temperatures of the elastomers ($T_g$) were measured by differential scanning calorimetry upon 20–25 mg of polymer molded at 150° C. for 15 minutes followed by annealing at room temperature for 24 h. $T_g$ is reported as the midpoint of the glass transition on the heating curve of the sample, recorded on a Perkin Elmer DSC 7 differential scanning calorimeter (from −100° C. to 180° C. at a heating rate of 20° C./minute).

Hysteresis (Tan δ)

The hysteresis of the elastomers (tan δ; ASTM standard D945) was determined using a Monsanto Rubber Process Analyzer model RPA 2000 and is reported as the average of ten measurements made at 150° C. at a frequency of 0.25 rad/s and at a strain of 10° arc (14%).

Ethylene:Propylene Ratio and Diene Content

The ethylene:propylene ratio and the diene content of the elastomers were determined by infrared spectroscopy of thin polymer films on a Perkin-Elmer infrared spectrophotometer model Paragon 1000 PC, according to ASTM standard D3900.

General Solution Polymerization Procedure A (Employing an MAO Cocatalyst)

The metallocene procatalyst was tared into a hypovial and combined with vigorous mixing under argon with the appropriate aliquot of MAO solution. The resulting catalyst solution was aged for 30 minutes prior to use. In one polymerization run, 0.056 grams (100 micromoles) of diphenylmethylene(cyclopentadienyl)(fluorenyl)zirconium dichloride [Ph$_2$C(Cp-9-Flu)ZrCl$_2$] was reacted with 40.0 ml of MAO solution. This yielded a catalyst solution with Zr=2.0 mM and an Al/Zr ratio of 1250.

Next, a 2-liter glass reactor was charged with 1500 ml of hexane, 1.2 ml Al(Bu$^i$)$_3$, equivalent to 1.0 mmol Al, the appropriate aliquots of diene, and 50 psi each of ethylene and propylene (mass flow ratio determined on rotameters) and allowed to thermally equilibrate.

The catalyst solution was then injected in,o the reactor. Ethylene and propylene were supplied on demand to maintain reactor pressure at 50 psi. The polymerization was terminated with 100 ml of acidified methanol (one volume % concentrated HCl) and the resulting polymer was coagulated and thereafter mill-dried.

General Solution Polymerization Procedure B (Employing A Cation-generating Cocatalyst)

A 2-liter glass reactor was charged with 1500 ml of hexane, 1.2 ml of Al(Bu$^i$)$_3$ (1.0 mmol Al), the appropriate aliquots of diene and 50 psi each of ethylene and propylene (mass flow ratio determined on rotameters) and allowed to thermally equilibrate. The catalyst, 1.0 ml of a 10 mM solution of Ph$_2$C(Cp-9-Flu)ZrCl$_2$ (0.056 g, 100 micromoles in 10 ml toluene), was injected into the reactor and allowed to react with the Al(Bu$^i$)$_3$ for 2 minutes.

The remaining components of the cocatalyst, e.g., 1.0 ml of a 10 mM solution of B (C$_6$F$_5$)$_3$ (0.102 g, 100 micromol) and LiB(C$_6$F$_5$)$_4$ (0.152 g, 100 micromol) in 10 ml of toluene, were injected into the reactor. Ethylene and propylene were supplied on demand to maintain the reactor pressure at 50 psi. Polymerization was terminated with 100 ml of acidified methanol (1 vol % concentrated HCl) and the resulting polymer was coagulated and thereafter mill-dried.

The polymer products were analyzed by IR spectroscopy to determine the E:P ratio and diene content. In addition, for most samples, molecular weight ($M_w$) thermal transitions (DSC), tan δ, and Mooney viscosity at 125° C. were determined.

The specific polymerization conditions and physical properties of the resulting polymers for each of the examples are summarized in Tables-1–6, infra.

Comparative Examples 1–19

Employing solution polymerization procedure A described above, several MAO-activated bridged metallocene catalysts whose bridging groups lack bulky groups were utilized for the attempted preparation of EP and EPDM-type elastomers. The conditions of each polymerization and the properties of the resulting polymers are summarized below in Table 1.

TABLE 1

COMPARATIVE EXAMPLES 1–19

A. POLYMERIZATION CONDITIONS AND RESULTS

| COMP. EX. | PROCATALYST M | μmol M | T (° C.) | FEED E:P | DIENE TYPE | DIENE mL | mmol Al $(Bu^i)_3$* | mmol Al (MAO) | MAO/ M | TIME (min) | YIELD (g) | ACTIVITY kg/qZr/h |
|---|---|---|---|---|---|---|---|---|---|---|---|---|
| 1 | rac-Et(Ind)$_2$ZrCl$_2$ | 2.5 | 40 | 2:1 | — | — | 1.0 | 2.8 | 1000 | 10 | 79 | 2009 |
| 2 | rac-Et(Ind)$_2$ZrCl$_2$ | 10.0 | 40 | 2:1 | ENB | 10.0 | 1.0 | 11.2 | 1000 | 10 | 204 | 1292 |
| 3 | rac-Et(Ind)$_2$ZrCl$_2$ | 10.0 | 40 | 2:1 | DCPD | 10.0 | 1.0 | 11.2 | 1000 | 10 | 110 | 695 |
| 4 | rac-Et(Ind)$_2$HfCl$_2$ | 25.0 | 40 | 1:1 | — | — | 1.0 | 42.0 | 1500 | 30 | 68 | 31 |
| 5 | rac-Et(Ind)$_2$HfCl$_2$ | 50.0 | 40 | 1:1 | ENB | 5.0 | 1.0 | 28.0 | 500 | 30 | 100 | 22 |
| 6 | rac-Et(Ind)$_2$HfCl$_2$ | 50.0 | 40 | 1:1 | DCPD | 5.0 | 1.0 | 28.0 | 500 | 30 | 87 | 20 |
| 7 | rac-Me$_2$Si(Ind)$_2$ZrCl$_2$ | 2.5 | 40 | 2:1 | — | — | 1.0 | 2.2 | 872 | 10 | 83 | 2171 |
| 8 | rac-Me$_2$Si(Ind)$_2$ZrCl$_2$ | 10.0 | 40 | 2:1 | ENB | 10.0 | 1.0 | 8.7 | 872 | 10 | 147 | 966 |
| 9 | rac-Me$_2$Si(Ind)$_2$ZrCl$_2$ | 10.0 | 40 | 2:1 | DCPD | 10.0 | 1.0 | 8.7 | 872 | 10 | 43 | 281 |
| 10 | rac-Me$_2$Si(Ind)$_2$HfCl$_2$ | 50.0 | 40 | 2:1 | — | — | 1.0 | 43.6 | 872 | 30 | 67 | 15 |
| 11 | rac-Me$_2$Si(Ind)$_2$HfCl$_2$ | 100.0 | 40 | 2:1 | ENB | 10.0 | 1.0 | 87.2 | 872 | 30 | 36 | 4 |
| 12 | rac-Me$_2$Si(Ind)$_2$HfCl$_2$ | 100.0 | 40 | 2:1 | DCPD | 10.0 | 1.0 | 87.2 | 872 | 30 | 32 | 4 |
| 13 | rac-Me$_2$Si(2-MeInd)$_2$ZrCl$_2$ | 2.0 | 40 | 2:1 | — | — | 1.0 | 3.1 | 1560 | 10 | 53 | 1718 |
| 14 | rac-Me$_2$Si(2-MeInd)$_2$ZrCl$_2$ | 16.0 | 40 | 2:1 | ENB | 5.0 | 1.0 | 12.5 | 1560 | 15 | 32 | 88 |
| 15 | rac-Me$_2$Si(2-MeInd)$_2$ZrCl$_2$ | 16.0 | 40 | 2:1 | DCPD | 5.0 | 1.0 | 12.5 | 1560 | 15 | 10 | 28 |
| 16 | Me$_2$Si(Flu)$_2$ZrCl$_2$ | 2.6 | 40 | 2:1 | — | — | 1.0 | 2.8 | 1080 | 10 | 147 | 3714 |
| 17 | Me$_2$Si(Flu)$_2$ZrCl$_2$ | 10.4 | 40 | 2:1 | ENB | 5.0 | 1.0 | 11.2 | 1080 | 10 | 77 | 461 |
| 18 | Me$_2$Si(Flu)$_2$ZrCl$_2$ | 10.4 | 40 | 2:1 | DCPD | 5.0 | 1.0 | 11.2 | 1080 | 10 | 77 | 486 |
| 19 | Me$_2$C(Cp-9-Flu)ZrCl$_2$ | 20.0 | 40 | 1:1 | — | — | 1.0 | 20.6 | 1030 | 30 | 91 | 99 |

B. POLYMER PROPERTIES

| COMP. EX. | $M_w \times 10^3$ | $M_w/M_n$ | $ML_{1+4}$ (125° C.) | POLYMER E:P | DIENE (wt %) | Tg (° C.) | tan δ | COMMENT |
|---|---|---|---|---|---|---|---|---|
| 1 | 161 | 1.85 | low | 82:18 | — | −39 | n.d. | Low Mooney |
| 2 | 142 | 2.15 | low | 69:31 | 6.6 | −49 | n.d. | Low Mooney |
| 3 | 159 | 1.92 | low | 80:20 | 9.9 | −31 | n.d. | Low Mooney |
| 4 | 616 | 2.06 | 90 | 59:41 | — | −57 | n.d. | Low activity |
| 5 | 514 | 2.19 | 70 | 59:41 | 3.7 | −52 | n.d. | Low activity |
| 6 | 582 | 2.37 | 91 | 59:41 | 4.5 | −51 | n.d. | Low activity |
| 7 | 184 | 2.03 | low | 76:24 | — | −38 | n.d. | Low Mooney |
| 8 | 164 | 2.07 | low | 70:30 | 4.9 | −45 | n.d. | Low Mooney |
| 9 | 197 | 1.83 | low | 80:20 | 11.0 | −28 | n.d. | Low Mooney |
| 10 | 443 | 2.31 | n.d. | 65:35 | — | −55 | n.d. | Low activity |
| 11 | 162 | 2.02 | low | 68:32 | 12.1 | −42 | n.d. | Low activity |
| 12 | 213 | 1.84 | low | 69:31 | 13.6 | −38 | n.d. | Low activity |
| 13 | 336 | 1.98 | 35 | 80:20 | — | −39 | 2.7 | — |
| 14 | 330 | 1.86 | 45 | 78:22 | 0.0 | −38 | 2.9 | No diene incorporation; diene inhibition of activity |
| 15 | 320 | 1.89 | n.d. | 79:21 | 0.0 | −38 | 3.4 | No diene incorporation; diene inhibition of activity |
| 16 | 486 | 2.05 | 52 | 68:32 | — | −58 | n.d. | — |
| 17 | 477 | 1.96 | 48 | 83:17 | 0.0 | −61 | n.d. | No diene incorporation; diene inhibition of activity |
| 18 | 409 | 1.95 | 43 | 79:21 | 0.0 | −58 | n.d. | No diene incorporation; diene inhibition of activity |
| 19 | 44 | 1.92 | low | 58:42 | — | n.d. | n.d. | Low Mooney, low activity |

*Added to reduce the MAO/Zr AND MAO/Hf ratios.

As these data show, Comparative Examples 1–3 and 7–9 illustrating the use of zirconium-based metallocene catalysts yielded low Mooney viscosity polymers and Comparative Examples 4–6 and 10–12 illustrating the use of hafnium-based metallocene catalysts exhibited unacceptably low activity. All of the catalysts employed in Comparative Examples 1–13 showed relatively poor activity toward propylene. Comparative Examples 14,15,17 and 18 yielded copolymers only, not terpolymers; there was no diene incorporation and diene inhibition was observed. Comparative Example 19 showed low catalyst activity and the resulting elastomer possessed low Mooney viscosity.

Examples 1–3

Employing solution polymerization procedure A described above, MAO-activated bridged metallocene catalysts whose bridging groups possess two bulky groups were utilized for the production of elastomers. The conditions of each polymerization and the properties of the resulting elastomers are summarized in Table 2.

TABLE 2

EXAMPLES 1-3

A. POLYMERIZATION CONDITIONS

| EX. | PROCATALYST M | [2mol M | T (° C) | FEED E:P | DIENE TYPE | DIENE mL | mmol Al (Buⁱ)₃* | mmol Al (MAO) | MAO/ M |
|---|---|---|---|---|---|---|---|---|---|
| 1 | Ph₂C(Cp-9-Flu)ZrCl₂ | 10.0 | 40 | 2:1 | — | — | 1.0 | 25.0 | 2500 |
| 2 | Ph₂C(Cp-9-Flu)ZrCl₂ | 10.0 | 40 | 2:1 | ENB | 10.0 | 1.0 | 25.0 | 2500 |
| 3 | Ph₂C(Cp-9-Flu)ZrCl₂ | 10.0 | 40 | 2:1 | DCPD | 10.0 | 1.0 | 25.0 | 2500 |

B. POLYMERIZATION RESULTS AND POLYMER PROPERTIES

| EX. | TIME (min) | YIELD (g) | ACTIVITY kg/qZr/h | $M_w \times 10^3$ | $M_w/M_n$ | $ML_{1+4}$ (125° C.) | POLYMER E:P | DIENE (wt %) | Tg (° C.) | tan δ | COMMENT |
|---|---|---|---|---|---|---|---|---|---|---|---|
| 1 | 15 | 99 | 433 | 260 | 1.92 | 22 | 71:29 | — | −43 | n.d. | High MAO/Zr required for good results |
| 2 | 15 | 90 | 394 | 232 | 2.00 | 20 | 70:30 | 7.2 | −41 | n.d | High MAO/Zr required for good results |
| 3 | 15 | 92 | 403 | 232 | 2.02 | 21 | 71:29 | 6.9 | −39 | n.d. | High MAO/Zr required for good results |

*Added to reduce the MAO/Zr ratios.

In these examples, the yields were high and good E:P ratio were consistently achieved. In Examples 2 and 3, diene was successfully incorporated into the polymers to provide EPDM elastomers. All of the elastomers exhibited good properties. Examples 1 to 3 also demonstrate the typically high ratios of MAO to metallocene that are needed for good results.

Examples 4–9

The polymerization procedures used in these examples are similar to those employed in Examples 1–3 and are intended to show the beneficial effects of employing an additional diene monomer as a branching agent upon certain of the properties of the resulting EPDM-type elastomers, specifically, their Mooney viscosity, $M_w$, $M_w/M_n$ and tan δ values. The conditions of each polymerization and the properties of the resulting polymers are summarized in Table 3.

TABLE 3

EXAMPLES 4–9

A. POLYMERIZATION CONDITIONS

| EX. | PROCATALYST M | μmol M | T (° C.) | FEED E:P | DIENE TYPE | DIENE mL | BRANCHING AGENT TYPE | BRANCHING AGENT mL | mmol Al (Buⁱ)₃* | mmol Al (MAO) | MAO/ M |
|---|---|---|---|---|---|---|---|---|---|---|---|
| 4 | Ph₂C(Cp-9-Flu)ZrCl₂ | 10.0 | 70 | 2:1 | ENB | 5.0 | — | — | 1.0 | 25.0 | 2500 |
| 5 | Ph₂C(Cp-9-Flu)ZrCl₂ | 10.0 | 70 | 2:1 | ENB | 4.88 | VNB | 0.12 | 1.0 | 25.0 | 2500 |
| 6 | Ph₂C(Cp-9-Flu)ZrCl₂ | 10.0 | 70 | 2:1 | ENB | 4.75 | VNB | 0.25 | 1.0 | 25.0 | 2500 |
| 7 | Ph₂C(Cp-9-Flu)ZrCl₂ | 10.0 | 70 | 2:1 | ENB | 4.5 | VNB | 0.5 | 1.0 | 25.0 | 2500 |
| 8 | Ph₂C(Cp-9-Flu)ZrCl₂ | 10.0 | 40 | 2:1 | ENB | 9.5 | OD | 0.5 | 1.0 | 12.5 | 1250 |
| 9 | Ph₂C(Cp-9-Flu)ZrCl₂ | 10.0 | 70 | 2:1 | ENB | 9.5 | OD | 0.5 | 1.0 | 12.5 | 1250 |

B. POLYMERIZATION RESULTS AND POLYMER PROPERTIES

| EX. | TIME (min) | YIELD (g) | ACTIVITY kg/qZr/h | $M_w \times 10^3$ | $M_w/M_n$ | $ML_{1+4}$ (125° C.) | POLYMER E:P | DIENE (wt %) | Tg (° C.) | tan δ | COMMENT |
|---|---|---|---|---|---|---|---|---|---|---|---|
| 4 | 15 | 90 | 394 | 214 | 1.93 | 16 | 77:23 | 5.6 | −33 | 4.5 | High MAO/Zr required for good results |
| 5 | 15 | 92 | 404 | 227 | 2.08 | 21 | 76:24 | 5.5 | −37 | 1.8 | High MAO/Zr required for good results |
| 6 | 15 | 89 | 390 | 272 | 2.42 | 31 | 77:23 | 5.6 | −35 | 0.9 | High MAO/Zr required for good |

TABLE 3-continued

EXAMPLES 4–9

| | | | | | | | | | | | results |
|---|---|---|---|---|---|---|---|---|---|---|---|
| 7 | 15 | 91 | 399 | 354 | 2.75 | 44 | 77:23 | 5.1 | −34 | 0.6 | High MAO/Zr required for good results |
| 8 | 15 | 36 | 156 | 378 | 2.18 | 91 | 75:25 | 13.0 | n.d. | n.d | High MAO/Zr required for good results |
| 9 | 15 | 34 | 148 | 291 | 2.26 | 65 | 77:23 | 16.4 | n.d. | n.d. | High MAO/Zr required for good results |

Examples 4 to 7 employing a MAO/metallocene ratio twice as high as that of Example 8 and 9 resulted in much greater yields and much higher activities that the latter further demonstrating the need to utilize very high MAO/metallocene ratios in order to achieve optimum process results. Examples 5 to 9 show that incorporation of a branching diene resulted in improvements in the Mooney viscosity, $M_w$, $M_w/M_n$ and tan δ values (where determined) of each elastomer relative to the elastomer of Example 4 which contained no branching diene.

Comparative Examples 20–23; Examples 10–19

Employing solution polymerization procedure B described above, metallocene catalysts whose bridging groups possess two bulky groups and which were activated by cation-generating cocatalyst both within (Examples 10–19) and outside (Comparative Examples 20–23) the scope of the invention were used for the preparation of EPDM elastomers. The conditions of each polymerization and the properties of the resulting polymers are summarized in Table 4.

TABLE 4

COMPARATIVE EXAMPLES 20–23; EXAMPLES 10–19

A. POLYMERIZATION CONDITIONS

| COMP. EX./ EX. | PROCATALYST M | μmol M | T (° C.) | FEED E:P | DIENE TYPE | mL | BRANCHING AGENT TYPE | mL | mmol Al (Bu$^i$)$_3$ | CATION-GENERATING COCATALYST BORON CMPD(S)* | μmol B | B/M |
|---|---|---|---|---|---|---|---|---|---|---|---|---|
| 20 | Ph$_2$C(Cp-9-Flu)ZrCl$_2$ | 10.0 | 70 | 2:1 | ENB | 4.5 | VNB | 0.5 | 1.0 | B | 20 | 2 |
| 21 | Ph$_2$C(Cp-9-Flu)ZrCl$_2$ | 10.0 | 70 | 2:1 | ENB | 4.5 | VNB | 0.5 | 1.0 | Ph$_3$C | 10 | 1 |
| 22 | Ph$_2$C(Cp-9-Flu)ZrCl$_2$ | 10.0 | 70 | 2:1 | ENB | 4.5 | VNB | 0.5 | 1.0 | HNMe$_2$Ph | 20 | 2 |
| 23 | Ph$_2$C(Cp-9-Flu)ZrCl$_2$ | 10.0 | 70 | 2:1 | ENB | 4.5 | VNB | 0.5 | 1.0 | LiB | 20 | 2 |
| 10 | Ph$_2$C(Cp-9-Flu)ZrCl$_2$ | 10.0 | 70 | 2:1 | ENB | 4.5 | VNB | 0.5 | 1.0 | LiB + B | 20 | 2 |
| 11 | Ph$_2$C(Cp-9-Flu)ZrCl$_2$ | 10.0 | 40 | 1:1 | ENB | 9.75 | VNB | 0.25 | 1.0 | LiB + B | 20 | 2 |
| 12 | Ph$_2$C(Cp-9-Flu)ZrCl$_2$ | 10.0 | 40 | 1.25:1 | ENB | 9.75 | VNB | 0.25 | 1.0 | LiB + B | 20 | 2 |
| 13 | Ph$_2$C(Cp-9-Flu)ZrCl$_2$ | 10.0 | 40 | 1.5:1 | ENB | 9.75 | VNB | 0.25 | 1.0 | LiB + B | 20 | 2 |
| 14 | Ph$_2$C(Cp-9-Flu)ZrCl$_2$ | 10.0 | 40 | 1.5:1 | ENB | 9.65 | VNB | 0.35 | 1.0 | LiB + B | 20 | 2 |
| 15 | Ph$_2$C(Cp-9-Flu)ZrCl$_2$ | 10.0 | 40 | 2:1 | ENB | 9.75 | OD | 0.25 | 1.0 | LiB + B | 20 | 2 |
| 16 | Ph$_2$Si(Cp-9-Flu)ZrCl$_2$ | 10.0 | 40 | 1:1 | ENB | 4.82 | VNB | 0.18 | 1.0 | LiB + B | 20 | 2 |
| 17 | Ph$_2$Si(Cp-9-Flu)ZrCl$_2$ | 10.0 | 40 | 1.25:1 | ENB | 4.82 | VNB | 0.18 | 1.0 | LiB + B | 20 | 2 |
| 18 | Ph$_2$Si(Cp-9-Flu)ZrCl$_2$ | 10.0 | 40 | 1.5:1 | ENB | 4.82 | VNB | 0.18 | 1.0 | LiB + B | 20 | 2 |
| 19 | Ph$_2$Si(Cp-9-Flu)ZrCl$_2$ | 10.0 | 40 | 2:1 | ENB | 4.82 | VNB | 0.18 | 1.0 | LiB + B | 20 | 2 |

B. POLYMERIZATION RESULTS AND POLYMER PROPERTIES

| COMP. EX./ EX. | TIME (min) | YIELD (g) | ACTIVITY kg/gZr/h | $M_w \times 10^3$ | $M_w/M_n$ | $ML_{1+4}$ (125° C.) | POLYMER E:P | DIENE (wt %) | Tg (° C.) | tan δ | COMMENT |
|---|---|---|---|---|---|---|---|---|---|---|---|
| 20 | 10 | 12 | 80 | n.d. | n.d. | n.d. | n.d. | n.d. | n.d. | n.d. | Short-lived |
| 21 | 10 | 55 | 362 | 415 | 2.96 | 53 | 74.26 | 4.5 | −37 | 0.53 | Short-lived with very high initial activity |
| 22 | 10 | 111 | 730 | 620 | 3.38 | 127 | n.d. | n.d. | −34 | n.d. | Short-lived with very high initial activity; gel formed |
| 23 | 10 | 0 | — | — | — | — | — | — | — | — | No activity |
| 10 | 10 | 96 | 635 | 421 | 2.58 | 62 | 74.26 | 4.3 | −39 | 0.61 | Superior to those produced with MAO catalyst |
| 11 | 10 | 99 | 655 | 233 | 2.47 | 36 | 52:48 | 7.2 | −50 | 1.5 | Superior to those produced with MAO catalyst |
| 12 | 10 | 111 | 734 | 287 | 2.60 | 51 | 61:39 | 6.8 | −49 | 0.89 | Superior to those |

TABLE 4-continued

COMPARATIVE EXAMPLES 20–23; EXAMPLES 10–19

| | | | | | | | | | | | |
|---|---|---|---|---|---|---|---|---|---|---|---|
| 13 | 10 | 106 | 705 | 334 | 2.74 | 62 | 66:34 | 7.4 | −47 | 0.72 | Superior to those produced with MAO catalyst |
| 14 | 10 | 115 | 761 | 430 | 3.53 | 78 | 59:41 | 5.6 | −50 | n.d | Superior to those produced with MAO catalyst |
| 15 | 10 | 101 | 670 | 613 | 3.63 | 94 | 70:30 | 7.4 | −44 | 0.42 | Superior to those produced with MAO catalyst |
| 16 | 10 | 75 | 495 | 699 | 2.20 | — | 66:34 | 3.8 | −43 | 1.03 | Mooney too high to be measured |
| 17 | 10 | 68 | 453 | 820 | 2.37 | — | 70:30 | 4.3 | n.d. | n.d. | Mooney too high to be measured |
| 18 | 10 | 66 | 435 | 935 | 2.36 | — | 74:26 | 4.4 | n.d. | n.d. | Mooney too high to be measured |
| 19 | 10 | 74 | 488 | 928 | 2.39 | — | 77:23 | 4.3 | n.d. | n.d. | Mooney too high to be measured |

*B = B($C_6F_5$)$_3$; Ph$_3$ C = Ph$_3$CB ($C_6F_5$)$_4$; HNMe$_2$Ph = HNME$_2$PhB($C_6F_5$)$_4$; LiB = LiB($C_6F_5$)$_4$.

As these data show, the catalysts utilized in Comparative Examples 20–23 were short lived and resulted in little or no activity after an initial burst of high activity (the catalyst of Comparative Example 23 showed no activity at all). In contrast to these results, Examples 10–19 illustrating the use of a cation-generating cocatalyst in accordance with this invention showed consistently good activity for the entire polymerization term, a result demonstrating its much greater stability than the cation-generating cocatalysts of the comparative examples. This result is all the more surprising considering that the boron-containing compounds of the cation-generating cocatalyst of this invention when employed individually as in Comparative Examples 20 and 23 give unacceptable results.

Comparative Examples 24–43; Examples 20–24

Employing essentially the same procedures as in Comparative Examples 20–23/Examples 10–19, polymerizations were carried out with various metallocene catalysts that had been activated by cation-generating cocatalysts both within (Examples 20–24) and outside (Comparative Examples 24–43) the scope of the invention. The conditions of each polymerization and its results are summarized in Table 5.

TABLE 5

COMPARATIVE EXAMPLES 24–43: EXAMPLES 20–24
A. POLYMERIZATION CONDITIONS

| COMP. EX./EX. | PROCATALYST M | μmol M | T (° C.) | FEED E:P | mL ENB | mmol Al (Bu$^i$)$_3$ | CATION-GENERATING COCATALYST | | | TIME (min) | YIELD (g) | ACTIVITY kg/qZr/H | COMMENT |
|---|---|---|---|---|---|---|---|---|---|---|---|---|---|
| | | | | | | | BORON CMPD(S)* | μmol B | B/M | | | | |
| 24 | Cp$_2$ZrCl$_2$ | 2.5 | 40 | 1:1 | 5.0 | 1.0 | B | 5 | 2 | 10 | 7 | 175 | Short-lived |
| 25 | Cp$_2$ZrCl$_2$ | 2.5 | 40 | 1:1 | 5.0 | 1.0 | LiB | 5 | 2 | 10 | 0 | — | No activity |
| 26 | Cp$_2$ZrCl$_2$ | 2.5 | 40 | 1:1 | 5.0 | 1.0 | Ph$_2$C | 5 | 2 | 10 | 53 | 894 | Short-lived with very high initial activity |
| 27 | Cp$_2$ZrCl$_2$ | 2.5 | 40 | 1:1 | 5.0 | 1.0 | HNMe$_2$Ph | 5 | 2 | 10 | 38 | 649 | Short-lived, high initial activity |
| 20 | Cp$_2$ZrCl$_2$ | 2.5 | 40 | 1:1 | 5.0 | 1.0 | LiB + B | 5 | 2 | 10 | 37 | 631 | No decrease in activity with time |
| 28 | Me$_2$Si(Cp)$_2$ZrCl$_2$ | 10.0 | 40 | 1:1 | 5.0 | 1.0 | B | 20 | 2 | 10 | 9 | 59 | Short-lived |
| 29 | Me$_2$Si(Cp)$_2$ZrCl$_2$ | 10.0 | 40 | 1:1 | 5.0 | 1.0 | LiB | 20 | 2 | 10 | 5 | 36 | Very low activity |
| 30 | Me$_2$Si(Cp)$_2$ZrCl$_2$ | 10.0 | 40 | 1:1 | 5.0 | 1.0 | Ph$_3$C | 20 | 2 | 10 | 30 | 212 | Short-lived with very high activity |
| 31 | Me$_2$Si(Cp)$_2$ZrCl$_2$ | 10.0 | 40 | 1:1 | 5.0 | 1.0 | HNMe$_2$Ph | 20 | 2 | 10 | 20 | 139 | Short-lived, high initial activity, gel |
| 21 | Me$_2$Si(Cp)$_2$ZrCl$_2$ | 10.0 | 40 | 1:1 | 5.0 | 1.0 | LiB + B | 20 | 2 | 10 | 24 | 175 | No decrease in activity with time |
| 32 | rac-Et(Ind)$_2$ | 2.5 | 40 | 1:1 | 5.0 | 1.0 | B | 5 | 2 | 10 | 10 | 292 | Short-lived |

TABLE 5-continued

COMPARATIVE EXAMPLES 24–43: EXAMPLES 20–24
A. POLYMERIZATION CONDITIONS

| COMP. EX./EX. | PROCATALYST M | μmol M | T (° C.) | FEED E:P | mL ENB | mmol Al $(Bu^i)_3$ | CATION-GENERATING COCATALYST BORON CMPD(S)* | μmol B | B/M | TIME (min) | YIELD (g) | ACTIVITY kg/qZr/H | COMMENT |
|---|---|---|---|---|---|---|---|---|---|---|---|---|---|
| 33 | $ZrCl_2$ rac-Et(Ind)$_2$ ZrCl$_2$ | 2.5 | 40 | 1:1 | 5.0 | 1.0 | LiB | 5 | 2 | 10 | 0 | — | No activity |
| 34 | rac-Et(Ind)$_2$ ZrCl$_2$ | 2.5 | 40 | 1:1 | 5.0 | 1.0 | Ph$_3$C | 5 | 2 | 10 | 228 | 5642 | Short-lived with very high initial activity |
| 35 | rac-Et(Ind)$_2$ ZrCl$_2$ | 2.5 | 40 | 1:1 | 5.0 | 1.0 | HNMe$_2$Ph | 5 | 2 | 10 | 169 | 4239 | Short-lived, high initial activity, gel |
| 22 | rac-Et(Ind)$_2$ ZrCl$_2$ | 2.5 | 40 | 1:1 | 5.0 | 1.0 | LiB + B | 5 | 2 | 10 | 146 | 3712 | No decrease in activity with time |
| 36 | Me$_2$C(Cp-9-Flu) ZrCl$_2$ | 10.0 | 40 | 1:1 | 5.0 | 1.0 | B | 20 | 2 | 10 | 9 | 65 | Short-lived |
| 37 | Me$_2$C(Cp-9-Flu) ZrCl$_2$ | 10.0 | 40 | 1:1 | 5.0 | 1.0 | LiB | 20 | 2 | 10 | 0 | — | No activity |
| 38 | Me$_2$C(Cp-9-Flu) ZrCl$_2$ | 10.0 | 40 | 1:1 | 5.0 | 1.0 | Ph$_2$C | 20 | 2 | 10 | 69 | 467 | Short-lived with very high initial activity |
| 39 | Me$_2$C(Cp-9-Flu) ZrCl$_2$ | 10.0 | 40 | 1:1 | 5.0 | 1.0 | HNMe$_2$Ph | 20 | 2 | 10 | 46 | 321 | Short-lived high initial activity, gel |
| 23 | Me$_2$C(Cp-9-Flu)ZrCl$_2$ | 10.0 | 40 | 1:1 | 5.0 | 1.0 | LiB + B | 20 | 2 | 10 | 55 | 380 | Slight decrease in activity with time |
| 40 | Me$_2$Si(Cp*)(NBu$^t$)TiCl$_2$ | 10.0 | 40 | 1:1 | 5.0 | 1.0 | B | 20 | 2 | 10 | 8 | 97 | Short-lived |
| 41 | Me$_2$Si(Cp*)(NBu$^t$)TiCl$_2$ | 10.0 | 40 | 1:1 | 5.0 | 1.0 | LiB | 20 | 2 | 10 | 0 | — | No activity |
| 42 | Me$_2$Si(Cp*)(NBu$^t$)TiCl$_2$ | 10.0 | 40 | 1:1 | 5.0 | 1.0 | Ph$_3$C | 20 | 2 | 10 | 107 | 1349 | Short-lived with very high initial activity |
| 43 | Me$_2$Si(Cp*)(NBu$^t$)TiCl$_2$ | 10.0 | 40 | 1:1 | 5.0 | 1.0 | HnMe$_2$Ph | 20 | 2 | 10 | 90 | 1154 | Short-lived, high initial activity, gel |
| 24 | Me$_2$Si(Cp*)(NBu$^t$)TiCl$_2$ | 10.0 | 40 | 1:1 | 5.0 | 1.0 | LiB + B | 20 | 2 | 10 | 94 | 1196 | No decrease in activity with time |

*B = B(C$_6$F$_5$)$_3$; Ph$_3$C = Ph$_3$CB(C$_6$F$_5$)$_4$; HNMe$_2$Ph = HNMe$_2$PhB(C$_6$F$_5$)$_4$; LiB = LiB(C$_6$F$_5$)$_4$.

Figure 1:
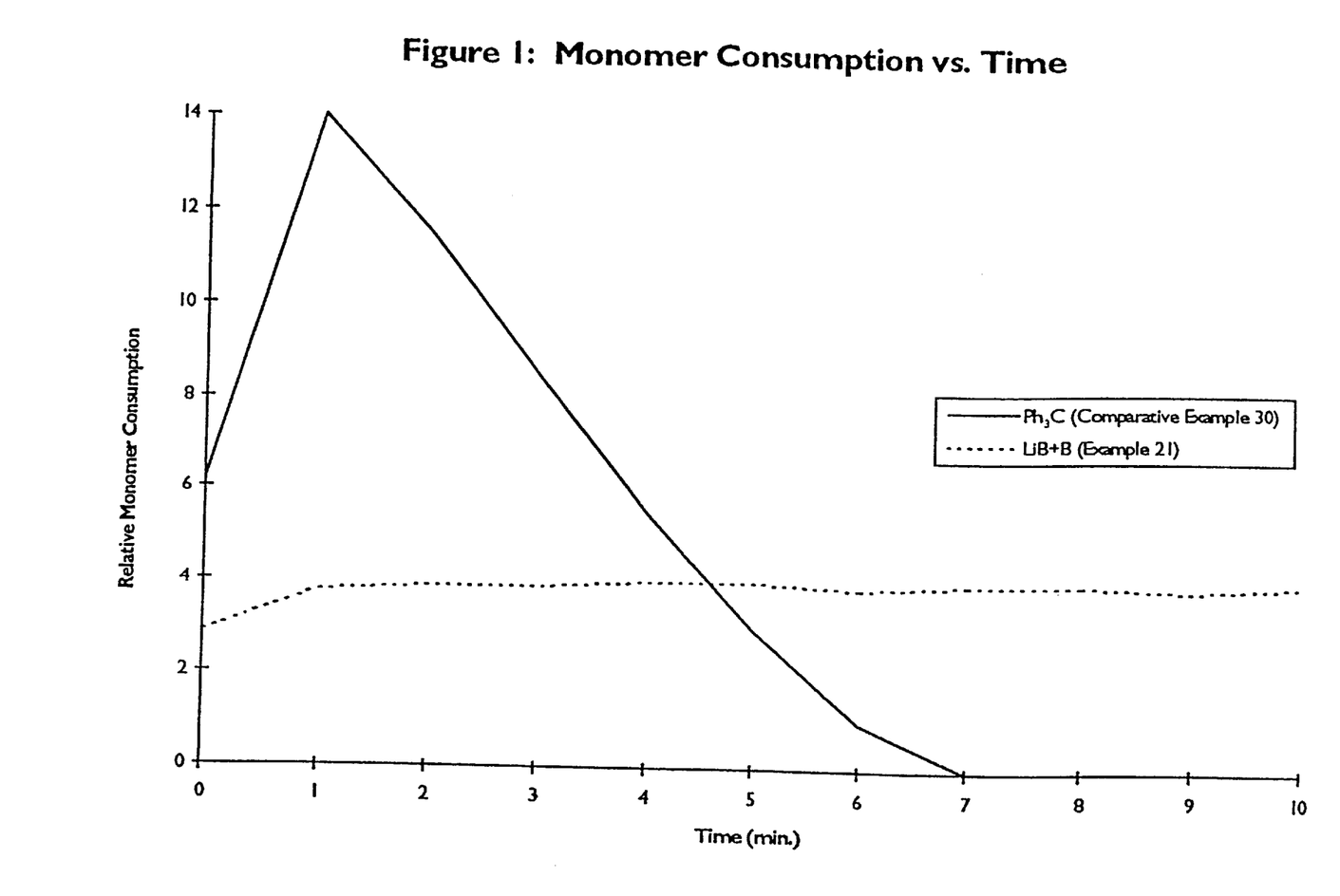
FIG. 1 is a graphical comparison of the stability of a metallocene procatalyst activated by cation-generating cocatalysts both within (Example 21) and outside (Comparative Example 30) the scope of the invention, the stability of the catalysts being shown as the amount of monomer consumed over time.

While the Al(Bu$^i$)$_3$+Ph$_3$C cocatalyst yields aln activated metallocene catalyst with very high initial activity (Comparative Examples 26, 30, 34, 38 and 42), the activity is short-lived compared to the far more stable catalysts that are obtained by activating the metallocene procatalysts with a cation-generating cocatalyst of this invention (Examples 20–24). This difference in results is graphically shown in accompanying FIG. 1 which presents a comparison in monomer consumption over time between procatalyst activated with Al(Bu$^i$)$_3$+Ph$_3$C (Comparative Example 30) and procatalyst activated with Al(Bu$^i$)$_3$+LiB+B (Example 21). The catalyst obtained with Al(Bui)$_3$+Ph$_3$C cocatalyst lost all activity within a matter of minutes while the catalyst obtained with the Al(Bu$^i$)$_3$+LiB+B cocatalyst of this invention continued to provide good activity for the entire 10 minutes of polymerization indicated and well beyond.

Largely the same sort of instability observed for metallocenes obtained with the Al(Bu$^i$)$_3$+PH$_3$C cocatalyst was also evident in the metallocenes activated with the Al(Bu$^i$)$_3$+HNMe$_3$Ph cocatalyst of Comparative Examples 27, 31, 35 and 39), the latter exhibiting the further disadvantage of causing gelation of the polymer.

Comparative Examples 44–48; Examples 25–27

Comparative Examples 44–48 utilized solution polymerization procedure A and are illustrative of the use of a known type of MAO-activated catalyst. Examples 25–27 utilized solution polymerization procedure B and illustrate the use of a catalyst obtained by activating the same procatalyst employed in the comparative examples with a cation-generating cocatalyst in accordance with the invention. The conditions of the polymerizations, their results and the properties of the product polymers are summarized in Table 6.

TABLE 6

COMPARATIVE EXAMPLES 44–48; EXAMPLES 25–27

A. POLYMERIZATION CONDITIONS

| COMP. EX./ EX. | PROCATALYST M | μmol M | T (°C.) | FEED E:P | DIENE TYPE | DIENE mL | BRANCHING DIENE TYPE | BRANCHING DIENE mL | MAO COCATALYST mmol Al (MAO) | MAO COCATALYST MAO/M | CATION-GENERATING COCATALYST mmol Al (bu$^i$)$_3$ | CATION-GENERATING COCATALYST BORON CMPD(S)* | CATION-GENERATING COCATALYST μmol B | CATION-GENERATING COCATALYST B/M |
|---|---|---|---|---|---|---|---|---|---|---|---|---|---|---|
| 44 | Me$_2$Si(Cp*)(NBu$^t$)TiCl$_2$ | 12.5 | 40 | 2:1 | ENB | 5.0 | — | — | 4.12 | 3300 | 1.0 | — | — | — |
| 45 | Me$_2$Si(Cp*)(NBu$^t$)TiCl$_2$ | 12.5 | 40 | 2:1 | ENB | 4.88 | VNB | 0.12 | 4.12 | 3300 | 1.0 | — | — | — |
| 46 | Me$_2$Si(Cp*)(NBu$^t$)TiCl$_2$ | 12.5 | 70 | 2:1 | ENB | 5.0 | — | — | 4.12 | 3300 | 1.0 | — | — | — |
| 47 | Me$_2$Si(Cp*)(NBu$^t$)TiCl$_2$ | 12.5 | 70 | 2:1 | ENB | 4.88 | VNB | 0.12 | 4.12 | 3300 | 1.0 | — | — | — |
| 48 | Me$_2$Si(Cp*)(NBu$^t$)TiCl$_2$ | 12.5 | 70 | 2:1 | ENB | 4.75 | VNB | 0.25 | 4.12 | 3300 | 1.0 | — | — | — |
| 25 | Me$_2$Si(Cp*)(NBu$^t$)TiCl$_2$ | 12.5 | 70 | 2:1 | ENB | 5.0 | — | — | — | — | 1.0 | LiB + B | 25 | 2 |
| 26 | Me$_2$Si(Cp*)(NBu$^t$)TiCl$_2$ | 12.5 | 70 | 2:1 | ENB | 4.75 | OD | 0.25 | — | — | 1.0 | LiB + B | 25 | 2 |
| 27 | Me$_2$Si(Cp*)(NBu$^t$)TiCl$_2$ | 12.5 | 70 | 2:1 | ENB | 4.5 | OD | 0.5 | — | — | 1.0 | LiB + B | 25 | 2 |

B. POLYMERIZATION RESULTS AND POLYMER PROPERTIES

| COMP. EX./ EX. | TIME (min) | YIELD (g) | ACTIVITY kg/gZr/h | $M_w \times 10^3$ | $M_w/M_n$ | $ML_{1+4}$ (125° C.) | POLYMER E:P | DIENE (wt %) | $T_g$ (°C.) | tan δ | COMMENT |
|---|---|---|---|---|---|---|---|---|---|---|---|
| 44 | 30 | 48 | 326 | 338 | 2.00 | 42 | 59:41 | 5.8 | −45 | 3.28 | High MAO/Zr |
| 45 | 30 | 50 | 337 | 438 | 2.26 | 72 | 62:38 | 5.8 | −43 | 1.16 | High MAO/Zr |
| 46 | 15 | 72 | 484 | 323 | 2.02 | 37 | 70:30 | 4.1 | −37 | 2.67 | High MAO/Zr, high T1 |
| 47 | 15 | 63 | 555 | 365 | 2.13 | 44 | 69:31 | 3.7 | −38 | 1.75 | High MAO/Zr, high T2 |
| 48 | 15 | 74 | 498 | 354 | 2.21 | 53 | 71:29 | 3.8 | −36 | 1.27 | High MAO/Zr, high T2 |
| 25 | 15 | 93 | 618 | 509 | 2.31 | 89 | 66:32 | 4.2 | −40 | 1.72 | Higher activity, M, than with MAO |
| 26 | 15 | 91 | 601 | 540 | 2.57 | 94 | 67:33 | 3.8 | −40 | 0.54 | OD very effective |
| 27 | 15 | 92 | 622 | 599 | 2.77 | 104 | 65:32 | 3.9 | −42 | 0.49 | Little additive benefit for additional OD |

*B = B(C$_6$F$_5$)$_3$; LiB = LiB(C$_6$F$_5$)$_4$.

When using MAO as the procatalyst (Comparative Examples 44–48), an extraordinarily high MAO/procatalyst ratio is required in order achieve acceptable catalytic activity. Especially at a higher temperature (70° C.), the reactivity of propylene is unfavorable and the $T_g$ of the product polymer is unacceptably high. In contrast to these results, the use of the cation-generating cocatalyst of this invention to activate the procatalyst (Examples 25–27) provided higher yields and greater activities and produced polymers with better $M_w$, $ML_{1+4}$ and $T_g$.

In an alternate embodiment of this invention it is contemplated that through the use, during polymerization, of known chain transfer agents, such as hydrogen, the molecular weights of the elastomers described herein can be intentionally and substantially reduced resulting in low molecular weight, even liquid polymers which may be desireable in particular end use applications.

What is claimed is:

1. An elastomer obtained from the liquid phase polymerization of ethylene, at least one other α-olefin and, optionally, it least one diene monomer to provide an elastomer, the process comprising polymerizing the monomer under liquid phase polymerization conditions in the presence of a catalytically effective amount of catalyst comprising the product obtained by combining a metallocene procatalyst with a cocatalyst, the metallocene procatalyst being at least one compound of general formulae (I) and/or (II):

$$(Cp^1R^1{}_m)R^3{}_n(Cp^2R^2{}_p)MX_q \quad (I)$$

$$(Cp^1R^1{}_m)R^3{}_nY_rMX_s \quad (II)$$

wherein Cp$^1$ of ligand (Cp$^1$R$^1{}_m$) and Cp$^2$ of ligand (Cp$^2$R$^2$p) are the same, or different cyclopentadienyl rings, R$^1$ and R$^2$ each is, independently, halogen or a hydrocarbyl, halocarbyl, hydrocarbyl-substituted organometalloid or halocarbyl-substituted organometalloid group containing up to about 20 carbon atoms, m is 0 to 5, p is 0 to 5 and two R$^1$ and/or R$^2$ substituents on adjacent carbon atoms of the cyclopentadienyl ring associated therewith can be joined together to form a ring fused to the cyclopentadienyl ring, the fused ring containing from 4 to about 20 carbon atoms, R$^3$ is a bridging group bridging Cp$^1$ and Cp$^2$, n is 0 or 1, Y is a heteroatom-containing group in which the heteroatom is coordinated to M, M is a transition metal having a valence of from 3 to 6, each X is a non-cyclopentadienyl ligand and is, independently, halogen or a hydrocarbyl, oxyhydrocarbyl, halocarbyl, hydrocarbyl-substituted organometalloid or halocarbyl-substituted organometalloid group containing up to about 20 carbon atoms, q is equal to the valence of M minus 2, r has the value of n and s is equal to the valence of M minus 1 the valence of M minus 2, r has the value of n and s is equal to the valence of M minus 1 when r is 0 and is equal to the valence of M minus 2 when r is 1, the cocatalyst being an aluminoxane or a different cation-generating cocatalyst comprising: a metal- and/or metalloid-containing first component capable of exchanging at least one X ligand in the metallocene procatalyst up to the total number thereof with, independently, a hydrogen atom, or a carbohydryl group containing up to about 20 carbon atoms or an oxycarbohydryl group containing up to 20 carbon atoms; a neutral metal- and/or metalloid-containing second component having at least one aryl group possessing at least one electron-withdrawing substituent; and, an anionic metal-containing third component having at least one aryl group possessing at least one electron-withdrawing constituent alone or in combination with a metalloid-containing third component having at least one aryl group possessing at least one electron-withdrawing constituent, provided, that when the metallocene procatalyst is one of formula (I) and the cocatalyst is entirely an aluminoxane, or combination of aluminoxane and added trialkylaluminum, ligand $(Cp^1R^1_m)$ is different from ligand $(Cp^2R^2_p)$, bridging group $R^3$ contains at least two bulky groups and n is 1 and when the procatalyst is entirely one of formula (II), the cocatalyst comprises said different cation-generating cocatalyst.

2. The elastomer of claim 1 wherein in metallocene procatalyst (I), bridging group $R^3$ possesses the structure in which groups $R^4$ and $R^5$ each, independently, is, or contains, a cyclic group of from 6 to about 20 carbon atoms, from 0 to 3 heteroatoms and hydrogen as the remaining atoms.

3. The elastomer of claim 2 wherein in metallocene procatalyst (I), the cyclic group is a cycloalkyl, heterocycloalkyl, cycloalkenyl, heterocycloalkenyl, aryl, heteroaryl, alkaryl, alkylheteroaryl, aralkyl or heteroaralkyl group.

4. The elastomer of claim 3 wherein in metallocene procatalyst (I), ligand $(Cp^1R^1_m)$ is unsubstituted cyclopentadienyl, ligand $(Cp^2R_p^2)$ is substituted or unsubstituted indenyl or fluorenyl, M is zirconium, $R^4$ and $R^5$ each is phenyl and each ligand X is chlorine.

5. The elastomer of claim 1 wherein in metallocene procatalyst (II), n and r are both 1, the valence of M is 4, ligand X is halogen and s is 2.

6. The elastomer of claim 1 wherein in the different cation-generating cocatalyst, the first component is an aluminum compound, the second component is a borane compound and the third component is a metal borate compound.

7. The elastomer of claim 6 wherein the aluminum compound is a trialkylaluminum or dialkylaluminum hydride, the borane compound is a tris(haloaryl)borane and the metal borate compound is an alkali metal-, alkaline earth metal- or transition metal-tetrakis (haloaryl)borate.

8. The elastomer of claim 7 wherein the aluminum compound is a trialkylaluminum, the borane compound is a tris(halophenyl)borane and the metal borate compound is an alkali metal tetrakis(halophenyl)borate.

9. The elastomer of claim 6 wherein the aluminum compound is at least one of trimethylaluminum, triethylaluminum, tri(n-propyl)aluminum, triisopropylaluminum, tri(n-butyl)aluminum, tri(n-propyl) aluminum, triisobutyl-aluminum, tri(n-hexyl)aluminum, tri (n-octyl) aluminum, dimethyaluminum hydride, diethylaluminum hydride, diisopropylaluminum hydride, di(n-propyl) aluminum hydride, diisobutylaluminum hydride, di(n-butyl) aluminum hydride, dimethylaluminum ethoxide, di(n-propyl)aluminum ethoxide, diisobutylaluminum ethoxide or di(n-butyl)aluminum ethoxide, the borane compound is at least one of tris(pentafluorophenyl)borane, tris (methoxyphenyl)borane, tris(trifluoromethylphenyl)borane, tris(3,5-di[trifluoromethyl]phenyl) borane, tris (tetrafluoroxylyl)borane or tris(tetrafluoro-o-tolyl)borane and the metal borate compound is at least one of lithium tetrakis(pentafluorophenyl)borate, lithium tetrakis (trifluoromethylphenyl)borate, lithium tetrakis (3,5-di [trifluoromethyl]phenyl)borate, sodium tetrakis (pentafluorophenyl)borate, potassium tetrakis (pentafluorophenyl)borate, magnesium tetrakis (pentafluorophenyl)borate, titanium tetrakis (pentafluorophenyl)borate or tin tetrakis (pentafluorophenyl)borate.

10. The elastomer of claim 1 wherein the metallocene procatalyst is combined with the components of the different cation-generating cocatalyst in the presence of monomer.

11. The elastomer of claim 2 wherein the metallocene procatalyst is combined with the components of the different cation-generating cocatalyst in the presence of monomer.

12. The elastomer of claim 3 wherein the metallocene procatalyst is combined with the components of the different cation-generating cocatalyst in the presence of monomer.

13. The elastomer of claim 4 wherein the metallocene procatalyst is combined with the components of the different cation-generating cocatalyst in the presence of monomer.

14. The elastomer of claim 5 wherein the metallocene procatalyst is combined with the components of the different cation-generating cocatalyst in the presence of monomer.

15. The elastomer of claim 6 wherein the metallocene procatalyst is combined with the components of the different cation-generating cocatalyst in the presence of monomer.

16. The elastomer of claim 7 wherein the metallocene procatalyst is combined with the components of the different cation-generating cocatalyst in the presence of monomer.

17. The elastomer of claim 8 wherein the metallocene procatalyst is combined with the components of the different cation-generating cocatalyst in the presence of monomer.

18. The elastomer of claim 9 wherein the metallocene procatalyst is combined with the components of the different cation-generating cocatalyst in the presence of monomer.

19. The elastomer of claim 1 wherein the α-olefin contains from 3 to about 20 carbon atoms.

20. The elastomer of claim 19 wherein the α-olefin is propylene.

21. The elastomer of claim 20 wherein one diene is a nonbranching diene and another diene is a branching diene.

22. The elastomer of claim 1 wherein polymerization is carried out under solution polymerization conditions.

23. The elastomer of claim 1 wherein polymerization is carried out under slurry polymerization conditions.

24. The elastomer of claim 1 possessing an $M_w$ of from about 200,000 to about 2,000,000, an $ML_{1+4}$ at 125° C. of from about 10 to about 200, an $M_w/M_n$ of from about 1.25 to about 10, a $T_g$ of below about −25° C. and a tan δ of from about 0.3 to about 7.

25. The elastomer of claim 24 possessing an $M_w$ of from about 275,000 to about 1,750,000, an $ML_{1+4}$ at 125° C. of from about 15 to about 175, an $M_w/M_n$ of from about 1.25 to about 8.5, a $T_g$ of about −30° C. and a tan δ of from about 0.35 to about 6.

26. The elastomer of claim 25 possessing an $M_w$ of from about 300,000 to about 1,500,000, an $ML_{1+4}$ at 125° C. of from about 20 to about 150, an $M_w/M_n$ of from about 2.0 to about 7.5, a $T_g$ below about −35° C. and a tan δ of from about 0.4 to about 5.

* * * * *